(12) United States Patent
Yehuda et al.

(10) Patent No.: US 7,555,719 B1
(45) Date of Patent: Jun. 30, 2009

(54) METHODS AND APPARATUS FOR DISPLAYING DATA STORAGE MANAGEMENT INFORMATION

(75) Inventors: Hanna Yehuda, Newton, MA (US); Morrie Gasser, Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 629 days.

(21) Appl. No.: 10/675,218

(22) Filed: Sep. 30, 2003

(51) Int. Cl.
*G06F 15/177* (2006.01)

(52) U.S. Cl. .................... 715/736; 715/734; 715/735; 715/738

(58) Field of Classification Search .................. 715/853, 715/730–745; 345/853, 734; 709/223, 224
See application file for complete search history.

(56) References Cited

U.S. PATENT DOCUMENTS 5,958,012 A * 9/1999 Battat et al. ................. 709/224
6,271,845 B1 * 8/2001 Richardson ................. 715/764
6,822,663 B2 * 11/2004 Wang et al. ................. 715/854
2004/0075680 A1 * 4/2004 Grace et al. ................. 345/734

* cited by examiner

*Primary Examiner*—Simon Ke
(74) *Attorney, Agent, or Firm*—Chapin IP Law, LLC

(57) ABSTRACT

A graphical user interface displays management information associated with one or more selected managed entities along with a drill down menu. The drill down menu includes selectable drill down options corresponding to respective drill down functions. Based on selection of a drill down option by a user, a respective drill down function is applied to the management information associated with the one or more selected managed entities. For example, after identifying a selected drill down option chosen from the drill down menu, a processor function associated with the graphical user interface produces a successive drill down view by applying the respective drill down function associated with the selected drill down option to the management information associated with the management view. This technique of drilling down based on selection of one of multiple selectable drill down options enables a network manager to more quickly traverse network management information.

36 Claims, 24 Drawing Sheets

METHODS AND APPARATUS FOR DISPLAYING DATA STORAGE MANAGEMENT INFORMATION

BACKGROUND OF THE INVENTION

Certain conventional computer systems include Graphical User Interface (GUI) software programs that enable network managers to graphically manage, control and configure various types of hardware and software resources or managed entities associated with a corresponding managed network. In one conventional application, a network management application rendering the graphical user interface enables the network manager to graphically select, interact with, and manage local or remote devices and associated software processes operating in the network. More specifically, based on use of the graphical user interface in combination with an input device such as a hand operated mouse and corresponding pointer displayed on a viewing screen, a network manager is able to manage hardware and software entities such as file systems, databases, storage devices, peripherals, network data communications devices, and so forth associated with the network. Typically, in such network management applications, a network manager may select a displayed icon representing a corresponding resource in the storage area network and apply a management command in order to display corresponding management information.

Another method for displaying management information includes accessing in a hierarchical menu of managed entities associated with a storage area network. For example, a hierarchical menu may include a listing of top level menus or directories of resources in the storage area network. Clicking on an icon in the top level menu results in a display of corresponding child icons. Clicking on a child produces yet more sub-children icons, and so on. This navigation technique may be repeated to identify any managed entity of the SAN. After the network manager selects a managed entity in the hierarchical display, another window in the GUI can display management information associated with the selected icon. As an example, if the network manager selects an icon associated with a file system (e.g., a folder for a directory), a corresponding window can display the contents of that directory. An example of a computer system management application that operates in this manner in the Windows Explorer software program bundled with the Windows version of operating systems manufactured by Microsoft Corporation of Redmond, Wash., USA.

SUMMARY OF THE INVENTION

Conventional network management software applications that graphically display management information associated with network resources suffer from a variety of deficiencies. For example, conventional computer system management software applications restrict the computer system manager to selecting a managed entity (e.g., a folder corresponding to a directory in a file system) from a list of managed entities (e.g., other folders) in a vertical hierarchy of icons. In response, the conventional management software presents the computer system manager with only one set of management characteristics concerning that selected managed entity and those management characteristics are presented according to a single fixed relationship or function that is invoked simply by selecting the entity itself. As an example, if a user (e.g., a computer systems administrator) uses Windows Explorer to select a folder icon, processing in the conventional application applies a single relationship function to that selected entity (i.e., the folder icon representing a directory in the file system) to produce a corresponding window in the GUI that displays the contents of that folder along with attributes concerning the entities (e.g., files and other folders) contained within or otherwise associated with the selected entity. Thus, in this example, the user is limited to simply double clicking the icon for a folder and viewing the contents of this folder. The function applied by this action is a "view contents of" function that only identifies the contents of the selected icon.

Such conventional management programs do not offer the ability for the user to select an icon representing a managed entity and in response, offer the ability to apply a plurality of different user selectable and concurrently available "drill down" functions to that entity to view relationships between that entity and other entities in the computer system according to different drill down functions. That is, such conventional applications do not offer the ability to display a drill down menu including selectable drill down options that correspond to respective drill down functions that the user can selectively apply to view related management information associated with the at least one managed entity and the selected entity. Instead, conventional programs such as Windows Explorer only offer the ability to re-apply the same navigation function formerly applied to arrive at the next view—that that function is limited to being the "display contents of" function in each new selection. There is no ability in such conventional programs to, for example, select an icon in a view and then select from a choice of various drill-down functions, all concurrently displayed in a drill down menu, that can be applied to that selected icon, such as drill down by Storage, by Host, by Database, by File System, by Device, by Adapter, by storage pool, by unallocated storage, and so forth in order to view how that selected entity (e.g., the selected folder in a file system) relates to these other types of information or entities associated with the selected drill down option.

As a specific example, there is no ability in conventional management software programs to select a file folder icon, and then to select from a variety of drill down options (that are all concurrently available for selection) to either view which specific disk drives or storage device store that contents of that file folder, or alternatively to view which host computer systems have access to that folder, or to view which database instances may be contained within that folder, or through which adapters (i.e., interfaces in a computer or in a data storage system) data for that entity must travel if accessed, or the like. Rather, in the resulting view from selecting one entity in a conventional management application, the user is relegated to being able to only apply the same function as previously applied which in the case of Windows explorer is the "show me the contents of this selected icon". This significantly limits the ways in which the management software can convey the relationship of the selected icon to other managed entities in a computer system or networked environment.

To summarize, conventional management software programs do not provide the ability for a user to select from a variety of concurrently available drill down functions that each correspond to specific drill down relationship functions of other managed entity types in the computer system or in a networked environment in order to view how the selected entity (corresponding to the selected icon) relates to such other entities as prescribed by a drill down function associated with the selected drill down option. Conventional systems do not thus produce a drill down view as explained herein that includes a presentation of the management information based on the applied respective drill down function.

Embodiments of the invention significantly overcome the aforementioned and other deficiencies of conventional computer and/or network display and management software systems. In particular, certain embodiments of the invention support techniques for selectively displaying management information (such as free space information, alert information, performance information, etc.) associated with managed hardware and software entities such as those of a storage area network (i.e., a SAN).

In general, management information associated with one or more managed entities of a SAN is displayed in conjunction with a drill down menu including multiple selectable "drill down" options. Based on selection of a drill option in the drill down menu, a user may quickly drill down to view increasingly more specific management information about the one or more managed entities of the STORAGE AREA NETWORK and this information is presented in the context of the selected drill down option (as opposed to always being displayed according to statically defined function such as simply displaying the contents of the entity, as is done in conventional systems). For example, a user may initially select multiple storage arrays for viewing associated management information such as free space available within those arrays. At the same time as being able to make this free space drill down selection, the user may be presented with a list of other available drill down options. A free space management view (e.g., a summary view) may include a single graph illustrating collective details of corresponding usage of storage for the selected multiple storage arrays. Another free space management view (e.g., a detail view) may include individually presented management information associated with each of the one or more selected managed entities associated with the network. There are then multiple drill down options concurrently presented for selection by the user in a drill down menu that each correspond with different relationship functions that the user may apply to selectable entities within the management view.

In response to selection of one of multiple drill down options in a drill down menu associated with the free space management view, a SAN manager is able to display and thus view increasingly more specific management information details of a particular managed entity depending on what information is important to the SAN manager. For example, the SAN manager may drill down by selecting different drill down options in the drill down menu. In comparison, conventional methods are restrictive because a SAN manager is limited to drilling down in a hierarchical menu and selecting an entity for which to only display contents of the selected entity as management information. Each time a manger wishes to display management information, the SAN manager must traverse the hierarchy of icons to find a corresponding entity for which to display management information and is limited to vie the contents of this selected entity. According to one embodiment of the invention, a SAN manager may drill down with respect to selected entities without necessarily having to traverse the original hierarchy of icons again and is not limited to viewing the results of the selection of an icon according to a single relationship function, such as showing the contents of an entity and the associated attributes (e.g., name of files, modification dates, size, etc.) of the items associated with the selected entity. Rather, several different drill down options can be presented allowing the user to apply many different types of relationship functions to the management data. Further examples of this will be explained through out this document.

Accordingly, general embodiments of the invention include a method and apparatus to support displaying management information in a graphical user interface. For example, a resource manager of the graphical user interface displays a management view including management information associated with one or more managed entities in a network along with a drill down menu associated with the management view. The drill down menu includes selectable drill down options corresponding to respective drill down functions. Based on selection of drill down options by a user, the drill down functions are respectively applied to the management information associated with the one or more managed entities. For example, after identifying a selected drill down option chosen (by a user) from the drill down menu, a processor function (e.g., resource manager) associated with the graphical user interface produces a drill down view by applying the respective drill down function associated with the selected drill down option to the one or more managed entities for which management information is displayed in a corresponding management view. Successive drill down views include a more detailed presentations of management information based on applied respective drill down functions. This technique of drilling down based on selection of one of multiple selectable drill down options enables a user (e.g., a network manager) to more quickly traverse network management information and identify potential problems.

In further embodiments and potentially other independent embodiments of the invention, the respective drill down function associated with a selected drill down option identifies a particular category in which to drill down to a lower level with respect to displayed management information. For example, management information displayed to a user in a drill down view may be free space information associated with the one or more selected managed entities (e.g., storage entities) of the network. Drilling down with respect to the free space management results in a newly produced drill down view including a more particular, lower level presentation of the free space management information associated with the one or more managed entities of the network. Depending on the embodiment, a drill down menu may include drill down options such as database, database file, file system, volume group, host device, HBA (Host Bus Adapter), storage device, pool, port/storage group, and unallocated devices.

Thus, in connection with a free space management view, a user may initially display free space management information associated with a managed entity such as a host server of a SAN. Based on application of, e.g., a "database" drill down option to the free space management information associated with the host server, a user may view free space management information associated with corresponding "databases" associated with the initially selected host server device. Because all of the aforementioned selectable drill down options do not necessarily apply to each possible displayable management view, pertinent drill down options in the drill down menu are highlighted to indicate to a user which drill down functions are applicable for drilling down further with respect to particular management view.

In more specific embodiments of the invention, a resource manager maintains a relational database of managed objects associated with managed entity icons corresponding to managed entities of a storage area network to track management information associated with the SAN. The managed objects include information such as foreign keys referencing other related managed objects. Based on use of the managed objects, the resource manager identifies management information associated with each of one or more selected managed entities.

Prior to display of management information, a SAN manager selects which entities of the SAN to display management information. The managed entities of the network (e.g., host servers, storage arrays, databases, volumes, ports, etc.) may be represented by corresponding managed entity icons displayed to a user in a hierarchy of selectable icons so that the SAN may select which managed entities to display management information. In one application, a user may traverse the hierarchy of selectable icons (or managed entities) by clicking on successively more detailed information with respect to a particular icon. For example, a user may click on a "host" icon in the hierarchy to display other managed entities associated with the host such as corresponding databases, files systems, etc. The user may click on a corresponding "database" icon to view specific databases associated with the hosts, and so on. Thus, a user may initially drill down in a hierarchical listing of icons to select one or more entities for which to display management information.

In relation to at least a portion of the managed entity icons in the hierarchy, the graphical user interface according to principles of the present invention generates a visual display region in which to receive an input selection by a user. For example, a user may select an icon (or multiple icons) in the hierarchy of icons for viewing associated management information by clicking on a corresponding visual display region associated with the icon. This input selection by a user identifies which managed entities of the network the user wishes to display management information. For example, a user may select multiple "storage array" icons under a "storage systems" icon to view corresponding free space management information associated with the multiple selected storage arrays.

In addition to selecting managed entities for which to display management information, the user may select a type of management view in which to display management information associated with selected managed entities. For example, in one embodiment, the resource manager supporting the graphical user interface receives the selection of a type of management view in which to display management information based on user input. In turn, the resource manager then retrieves corresponding managed objects stored in the database associated with the selected one or more managed entity icons to retrieve pertinent management information for display on a screen to the SAN manager. For example, if a user selects a management view such as "free space" mode in which to display management information, the resource manager retrieves free space information from the retrieved managed objects associated with selected managed entities of the SAN and applies the display function to produce the appropriate type of management view.

After applying the display function associated with a selected type of management view (e.g., a first management view), the resource manager may display graphical management information associated with the selected one or more managed entities in the network. In one application, a summary view includes a single graph of collective management information associated with the multiple selected managed entities associated with the storage area network. For example, a user may select multiple storage arrays for which to display free space management information. In such an instance, the resource manager may display a single graph identifying collective allocated space, available mapped space, and available unmapped space associated with multiple storage arrays of a storage area network.

In addition to the summary view of collective management information, the resource manager may display a detail view (e.g., a second management view) including individually presented management information for each of the one or more selected managed entities. For example, the detail view may include individual entries of management information for each of the selected storage arrays as discussed above. Displaying the collective management information in a first management view and also providing individual management information in a second management view enables a user to more quickly assess whether to continue drilling down with respect to the selected managed entities collectively or individually.

In one embodiment, the resource manager generating the graphical user interface enables a user to individually select each of one or more managed entities listed in the second management view by displaying the individual management information associated with the selected one or multiple managed entities. Selection of managed entities in the second management view may involve clicking on a corresponding input display region associated with each entry.

In addition to displaying the first and second management view, the resource manager also displays a drill down menu associated with the management views. The drill down menu includes selectable drill down options that correspond to respective drill down functions that may be selectively applied to the management information associated with the selected one or more managed entities in the second management view.

As previously mentioned, the drill down menu may include drill down options that are applicable to many different types of potentially selected managed entities. In one embodiment, after displaying management information with respect to certain selected managed entities, the resource manager highlights a subset of drill down options in the drill down menu depending on which of the drill down options may be selected by a user to produce a next displayable drill down view for selected management information.

The drill down menu may include two or more sets of selectable drill down options. For example, a first set of selectable drill down options relates to storage features of a storage area network. A second set of drill down options relates to host features of the storage area network.

To produce a drill down view associated with selected managed entities, the resource manager identifies a selected drill down option chosen from the drill down menu. For example, a user clicks on a highlighted drill down option in the drill down menu that shall be applied to selected entries in the second management view. In response to identifying a selected drill down option, the resource manager of the graphical user interface produces a drill down view by applying the respective drill down function associated with the selected drill down option to the management information associated with the one or more selected managed entities in the second management view. The produced drill down view includes a narrowed presentation of the management information based on the corresponding selected drill down option.

In one embodiment, the resource manager of the graphical user interface displays path information in relation to a management view. For example, each time a user drills down to a next lower level of management information associated with one or more selected managed entities, a new entry is added to the path information to identify a present drill down level. The path information may include one or more entries corresponding to previous drill down levels of the displayed management information in the management view. Based on selection of a particular entry (e.g., clicking on a word identifying a previous drill down level) in the displayed path information, a user may quickly revert back to a previous drill down level view.

In summary, a particular embodiment of the invention includes a display function supporting allocation of different portions of a display screen for different management functions. For example, a first portion of the display screen includes a hierarchy of selectable icons representing managed entities of a storage area network. As discussed, a SAN manager may select which of multiple entities to display corresponding management information. A second portion of the display screen includes a first management view (e.g., a summary view) including collective management information associated with selected managed entities of the storage area network. A third portion of the display screen includes a second management view (e.g., a detail view) including individually listed management information for each of the one or more selected managed entities of the storage area network. A fourth portion of the display screen includes a drill down menu for applying one of multiple drill down options to the selected managed entities of the SAN. Lastly, a fifth portion of the display screen includes path information identifying presently and previously displayed drill down views so that a user may quickly identify present and previous drill down views.

Other embodiments of the invention include a computer device (e.g., a host computer, workstation, etc.) configured to support the aforementioned operations disclosed herein. In such embodiments, the computer device includes a display, a memory system, a processor (e.g., a processing device) and an interconnect. In general, the interconnect supports communications among the display, the processor and the memory system. The memory system is encoded with a resource management application that, when executed on the processor, produces a resource management process supporting the embodiments discussed above.

Yet other embodiments of the invention disclosed herein include software programs to perform the method embodiment and operations summarized above and disclosed in detail below under the heading Detailed Description of Preferred Embodiments. More particularly, a computer program product (e.g., a computer-readable medium) including computer program logic encoded thereon may be executed on a computer device to support generation and display of management information views and associated operations as explained herein. The computer program logic, when executed on at least one processor of a corresponding computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed on a computer device to cause one or more processors in the computerized device to perform the techniques explained herein as embodiments of the invention. Software processes that operate in a collection of computer devices, such as in a group of storage area network management servers, can also support embodiments of the invention.

It is to be understood that the system of the invention can be embodied solely as a software program, or as a software program operating in conjunction with corresponding hardware. For example, embodiments of the invention may be implemented within EMC's Control Center (ECC) software application that provides graphical management functionality for storage area network resources. Embodiments of the invention may also be implemented in computer devices that operate the Control Center (ECC) software. Control Center software is manufactured by EMC Corporation of Hopkinton, Mass., USA.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION OF PREFERRED EMBODIMENTS

One embodiment of the present invention includes a graphical user interface that displays management information associated with one or more selected managed entities along with a drill down menu. The drill down menu includes selectable drill down options corresponding to respective drill down functions of the graphical user interface. Based on selection of a drill down option by a user, a respective drill down function is applied to the management information associated with the one or more selected managed entities. For example, after identifying a selected drill down option chosen from the drill down menu, a processor function associated with the graphical user interface produces a drill down view (e.g., a new management information view) by applying the respective drill down function associated with the selected drill down option to the management information associated with the management view. This technique of drilling down based on selection of one of multiple selectable drill down options enables a network manager to more quickly traverse network management information.

Figure 1:
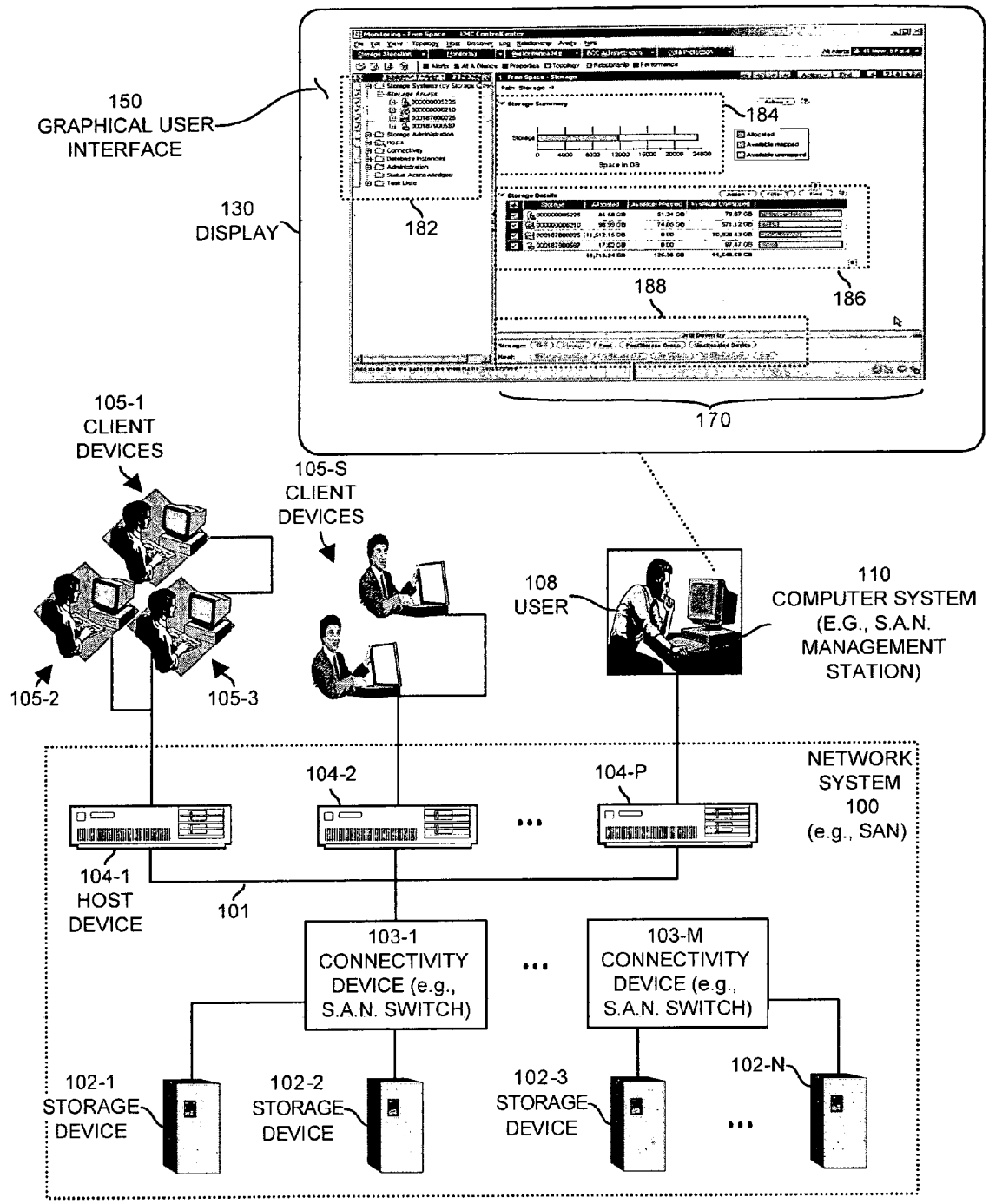
FIG. 1 is a pictorial diagram of a storage area network and corresponding management station configured to operate according to an embodiment of the invention.

FIG. 1 illustrates a network 100 (e.g., a storage area network) suitable for use in explaining the operation of example embodiments of the invention. As shown, the network 100 includes a network medium 101 such as a high-speed data communications medium (e.g., Ethernet, optical network, or other type of network) that interconnects a plurality of components such as storage devices 102-1, 102-2, ... 102-N (e.g., storage arrays), storage area network switches 103-1, . . . 103-M, host devices (e.g., host servers) 104-1, 104-2, . . . , 104-P, client devices 105-1, 105-2, . . . , 105-S, and computer system 110 (e.g., a storage area network management station).

Computer system 110 is configured, in this example, as a storage area network management station operated by network manager or user 108 (e.g., a user responsible for managing the resources within the storage area network 100). Computer system 110 executes a resource manager 120 (e.g., a graphical user interface software application more particularly shown in FIG. 2) that generates and displays management information views 170 in accordance with embodiments of the invention as will be explained herein. The resource manager 120 in this example may be any type of network management software application that executes, performs or otherwise operates within the management station computer system 110. It should be noted that computer system 110 may include certain other components such as one or more internal devices as well as software applications or processes that operate within or in conjunction with the illustrated components and devices in FIG. 1.

As shown towards the top of FIG. 1, and of particular interest to discussion of this invention, the management station computer system 110 is a computer device including corresponding display 130 (e.g., a cathode ray tube monitor, flat panel display or other visual display device). Computer system 110 operates to display management information 170 on display 130 according to a user 108 providing input commands. More specifically, user 108 controls what management information to display in management information views 170 by selecting icons in graphical user interface 150.

The graphical user interface 150 configured in accordance with embodiments of the invention includes a hierarchical arrangement of icons 182 (e.g., a hierarchy of vertically disposed icons) and management information view 170 on display 130. Each icon in the hierarchical arrangement of icons 182 represents a managed hardware or software entity associated with network 100. Generally, and as will be explained in more detail shortly, the graphical user interface 150 enables a user 108 of the computer system 110 to select one or more icons from the hierarchical arrangement of icons 182 displayed on the left side of display 130. In response to a selection of an icon (or multiple icons) associated with corresponding managed entities (e.g., a storage device 102, a database, a host computer, etc.) of network 100, computer system 110 displays a corresponding management information view 170 depending on a type of view selected by the user 108.

As a brief example, user 108 may select multiple icons such as storage array icons associated with storage devices 102-1, 102-2 from the hierarchical arrangement of icons 182. In this instance, computer system 110 will generate a management information view 170 including a summary view 184 and detail view 186 of management information associated with the selected storage arrays. Drill down menu 188 enables a user 108 to drill down with respect to selected icons in the detail view 186. Thus, based on management information in management information view 170, the user 108 (such as a SAN manager) is able to quickly drill down with respect to selected entities of interest.

Figure 2:
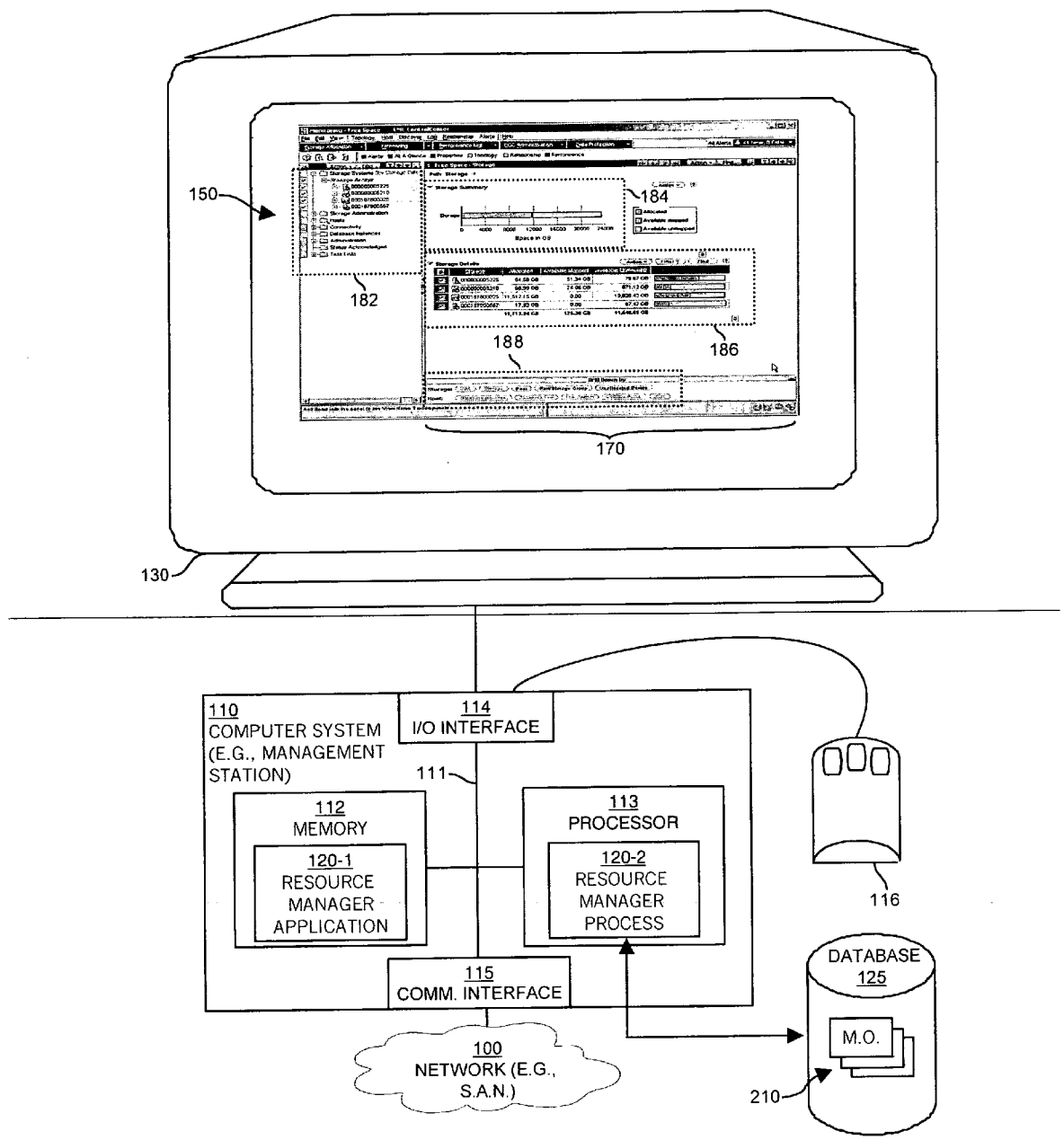
FIG. 2 is a block diagram of a sample architecture associated with the computer system management station in FIG. 1 including a graphical user interface according to an embodiment of the invention.

FIG. 2 is a block diagram more particularly illustrating an example architecture of computer system 110 (e.g., a storage area network management station) according to embodiments of the invention. Computer system 110 may be a computerized device such as a personal computer, workstation, portable computing device, console, network terminal or the like. As shown, computer system 110 of the present example includes an interconnect 111 that couples a memory system 112, a processor 113, an input/output interface 114 and a communications interface 115. Peripheral device 116 (e.g., one or more viewer controlled devices such as a keyboard, mouse, etc.) couples to processor 113 through I/O interface 114 and enables user 108 to provide input commands and thus generally control display management function of graphical user interface 150 of computer system 110. Database 125 stores managed objects 210 associated with managed entities (e.g., hardware and software entities) of network 100. Communications interface 115 enables computer system 110 (and corresponding user) to communicate with other devices (i.e., resources) associated with network 100.

As shown, memory 112 is encoded with resource manager application 120-1 supporting generation, display and functions associated with management information view 170 on display 130. Resource manager application 120-1 may be embodied as software code such as data and/or logic instructions (e.g., code stored in the memory or on another computer readable medium such as a disk) that supports processing functionality according to different embodiments of the invention as described herein. During operation, processor 113 accesses memory 112 via the interconnect 111 in order to launch, run, execute, interpret or otherwise perform the logic instructions of the resource manager application 120-1. Execution of resource manager application 120-1 produces processing functionality in resource manager process 120-2. In other words, the resource manager process 120-2 represents one or more portions of the resource manager application 120-1 (or the entire application 120-1) performing within or upon the processor 113 in the computerized device 110.

It should be noted that the resource manager 120 (e.g., display manager) executed in computer system 110 is represented in FIG. 2 by either one or both of the resource manager application 120-1 and/or the resource manager process 120-2. For purposes of the discussion of the operation of embodiments of the invention, general reference will be made to the resource manager 120 as performing the various steps and operations to carry out the features of embodiments of the invention.

It should also be noted that embodiments of the invention include the resource manager application 120-1 itself (i.e., the un-executed or non-performing logic instructions and/or data). The resource manager application 120-1 may be stored on a computer readable medium such as a floppy disk, hard disk or in an optical medium. The resource manager application 120-1 may also be stored in a memory type system such as in firmware, read only memory (ROM), or, as in this example, as executable code within the memory system 112 (e.g., within Random Access Memory or RAM). In addition to these embodiments, it should also be noted that other embodiments of the invention include the execution of resource manager application 120-1 in processor 113 as the resource manager process 120-2. Thus, those skilled in the art will understand that the computer system 110 may include other processes and/or software and hardware components, such as an operating system that controls allocation and use of hardware resources.

Display 130 need not be coupled directly to computer system 100. For example, the resource manager 120 can be executed on a remotely accessible computer device. In such an instance, the graphical user interface 150 may be displayed locally to the user, while the resource manager process 120 is executed remotely.

To generate a management information view 170, the host computer system 110 (e.g., the resource manager process 120-2) accesses information such as managed objects 210 stored in database 125. The managed objects may include management information (e.g., free space information, performance information, alert information, etc.) associated with the corresponding managed software and hardware entities in network 100. In one embodiment, computer system 100 accesses information from database 125 using SQL (Structured Query Language).

Figure 3:
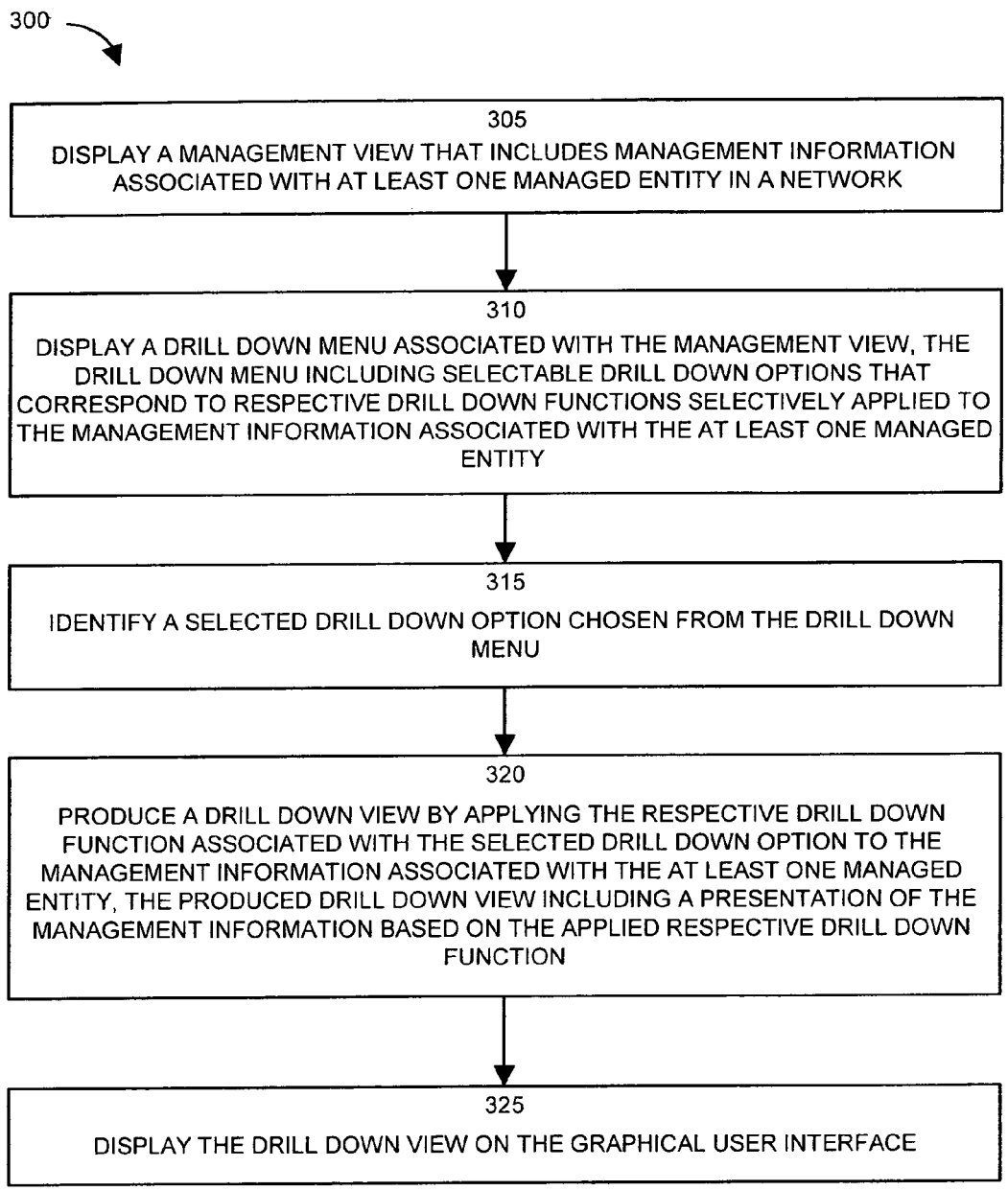
FIG. 3 is a flowchart for generating management views according to an embodiment of the invention.

FIG. 3 is a flowchart 300 of processing steps performed by resource manager 120 of computer system 110 according to an embodiment of the invention. In general, flowchart 300 illustrates how resource manager 120 enables user 108 at management station computer system 110 to display management information view 170 associated with one or more selected managed entities of network 100 on display 130. As its name suggests, management information view 170 graphically illustrates management information associated with various elements (e.g., host, storage application, database, etc.) of network 100. Note that the discussion of flowchart 300 in FIG. 3 will occasionally reference screenshot 400 in FIG. 4 to illustrate embodiments of the invention.

Figure 4:
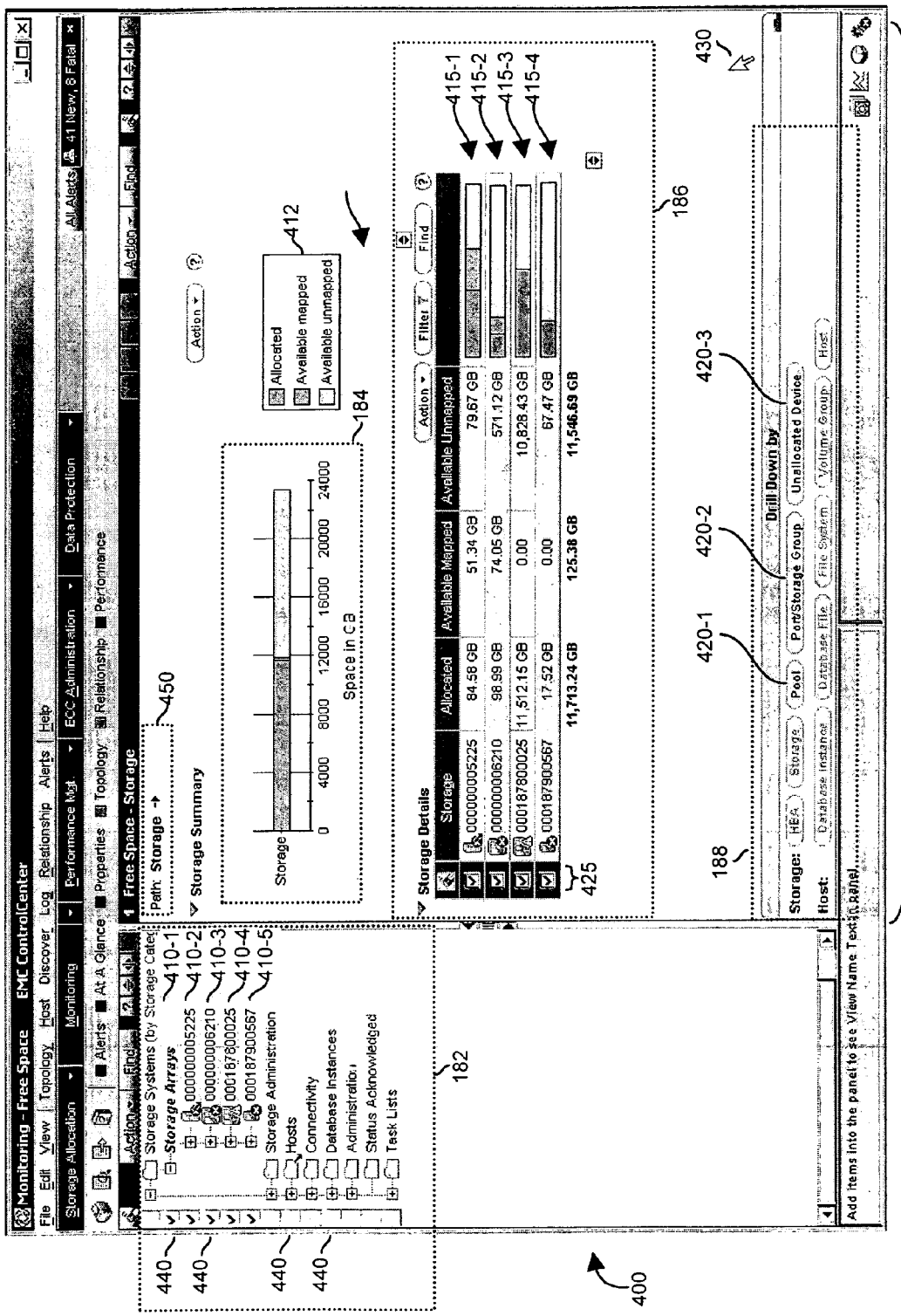
FIG. 4 is a screenshot of a management view according to an embodiment of the invention.

In step 305 of FIG. 3, resource manager 120 of computer system 110 displays a management information view 170 including management information (e.g., via summary view 184 and detail view 186) associated with one or more selected managed entities 410-2, 410-3, 410-4, 410-5 from hierarchical arrangement of icons 182 (in FIG. 4). For example, summary view 184 includes a graphical representation of collective free space management information associated with selected managed entities 410-2, 410-3, 410-4, and 410-5 of hierarchical arrangement of icons 182. Detail view 186 of management information view 170 includes individual entries 415 of management information associated with the selected managed entities 410-2, 410-3, 410-4, and 410-5 corresponding to storage arrays of network 100.

As shown in detail view 186, the management information may be displayed using appropriate textual and graphical information. Legend 412 identifies types of storage space in summary view 184 and detailed view 186. For example, different shadings as indicated by legend 412 identify amounts of collective storage space information associated with storage arrays (e.g., corresponding to selected managed entities 410-2, 410-3, 410-4 and 410-5) that is allocated, available mapped, and available unmapped.

In step 310, resource manager 120 displays drill down menu 188 in relation to summary view 184 and detail view 186 of management information view 170. The drill down menu 188 includes selectable drill down options 420 corresponding to respective drill down functions of graphical user interface 150 that may be applied to "drill down" or narrow a focus of displayed management information. Based on selection of a drill down option 420 by a user 108, resource manager applies a selected drill down function to the management information in detail view 186 associated with one or more managed entities. Note that a user 108 may select which entry 415 or entries 415 in detail view 186 to drill down to a next level. For example, initially detail view includes entries 415-1, 415-2, 415-3, 415-4 for each of the selected managed entity icons 410-2, 410-3, 410-4, and 410-5 in hierarchical arrangement of icons 182. The user 108 may deselect/select entries 415 in detail view 186 by clicking on input fields 425. Consequently, a user 108 may drill down with respect to a subset of managed entities that were originally chosen for displaying management information in management information view 170.

In step 315, the resource manager 120 identifies selection of a drill down option 420 in drill down menu 188 based on a user 108 clicking on the drill down option 420 with pointer 430. Pointer 130 is controlled by a corresponding computer mouse.

In step 320, after identifying a selected drill down option 420 chosen from the drill down menu 188, the resource manager 120 of computer system 110 produces a drill down view (e.g., a successive management information view 170) by applying the respective drill down function associated with the selected drill down option 420 to the selected entries 415 of management information associated with detail view 186.

In step 325, the new drill down view produced by resource manager 120 is displayed by overwriting an old management information view 170 on display screen 130. This technique of drilling down based on selection of one of multiple selectable drill down options 420 enables a user 108 (e.g., a network manager) to more quickly display different types of management information associated with network 100 compared to conventional methods.

In one embodiment, the respective drill down function associated with a selected drill down option 420 identifies a particular category in which to drill down to a lower level with respect to displayed management information. For example, as mentioned, the management information displayed in management information view 170 for a user may be free space information associated with the one or more managed entities (e.g., storage entities) of the network 100. Drilling down further with respect to a given free space management view 170 enables the user to produce new drill down views including more particular, lower level presentations of the free space management information associated with the one or more managed entities of the network 100. Depending on the embodiment, a drill down menu 188 may include drill down options 420 associated with managed entities in a storage area network 100 such as database, database file, file system, volume group, host device, HBA (Host Bus Adapter), storage device, pool, port/storage group, and unallocated devices as shown in FIG. 4.

Because all of the selectable drill down options 420 in drill down menu 188 do not necessarily apply to each possible displayable management view 170, resource manager 120 highlights pertinent drill down options 420 in the drill down menu 188 to indicate to a user 108 which drill down functions are applicable for drilling down further with respect to a presently displayed management view 170.

Additional functionality supported by computer system 110 and resource manager 120 according to embodiments of the invention will now be discussed with respect to flowchart 500 in FIGS. 5 and 6 and related screenshot 400 in FIG. 4. Note that flowchart 500 is a more detailed technique of the certain functionality described in flowchart 300 of FIG. 3.

Figure 5:
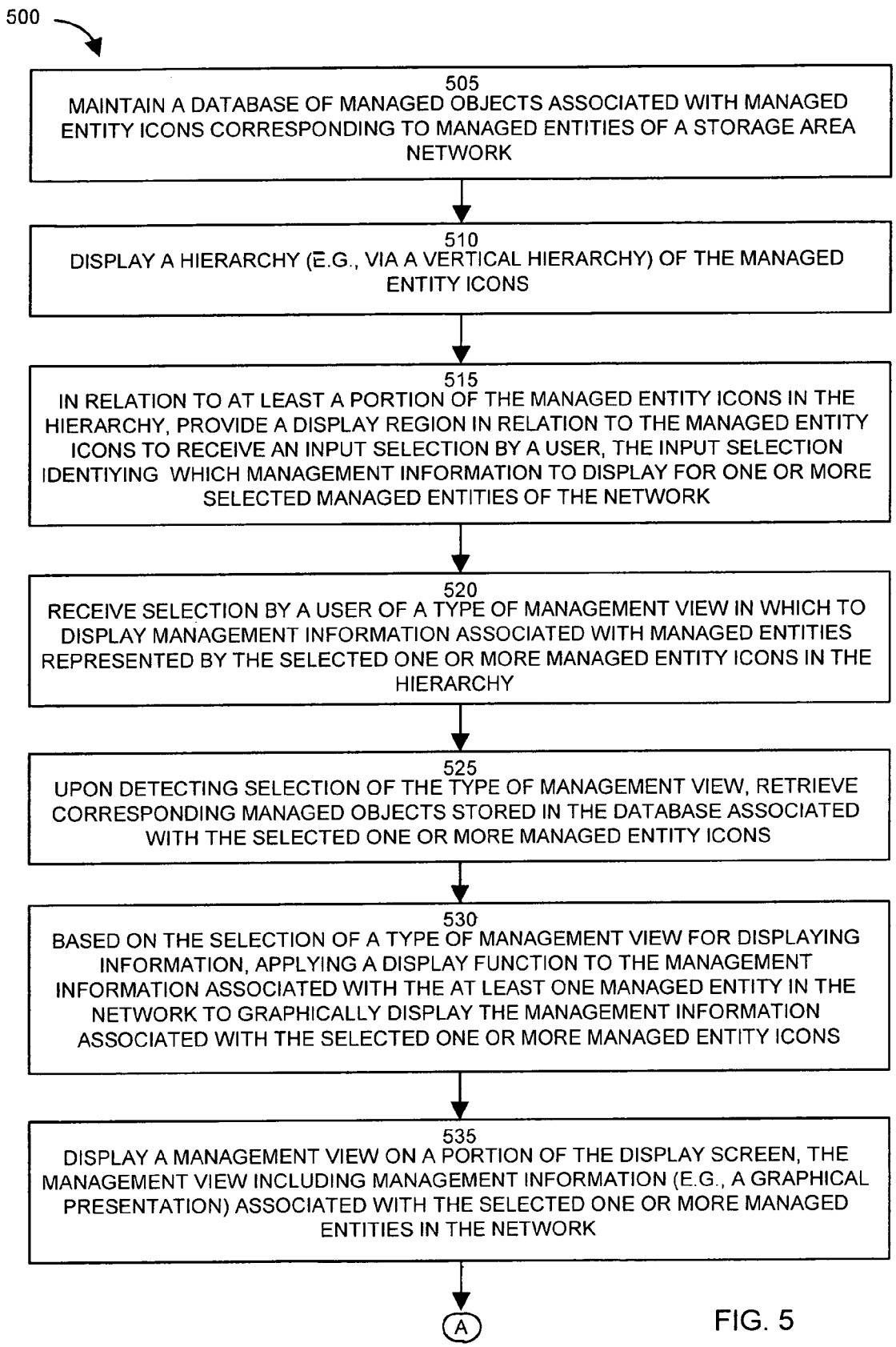
FIGS. 5 and 6 combine to form a flowchart illustrating a more detailed technique for generating management views according to an embodiment of the invention.
Figure 6:
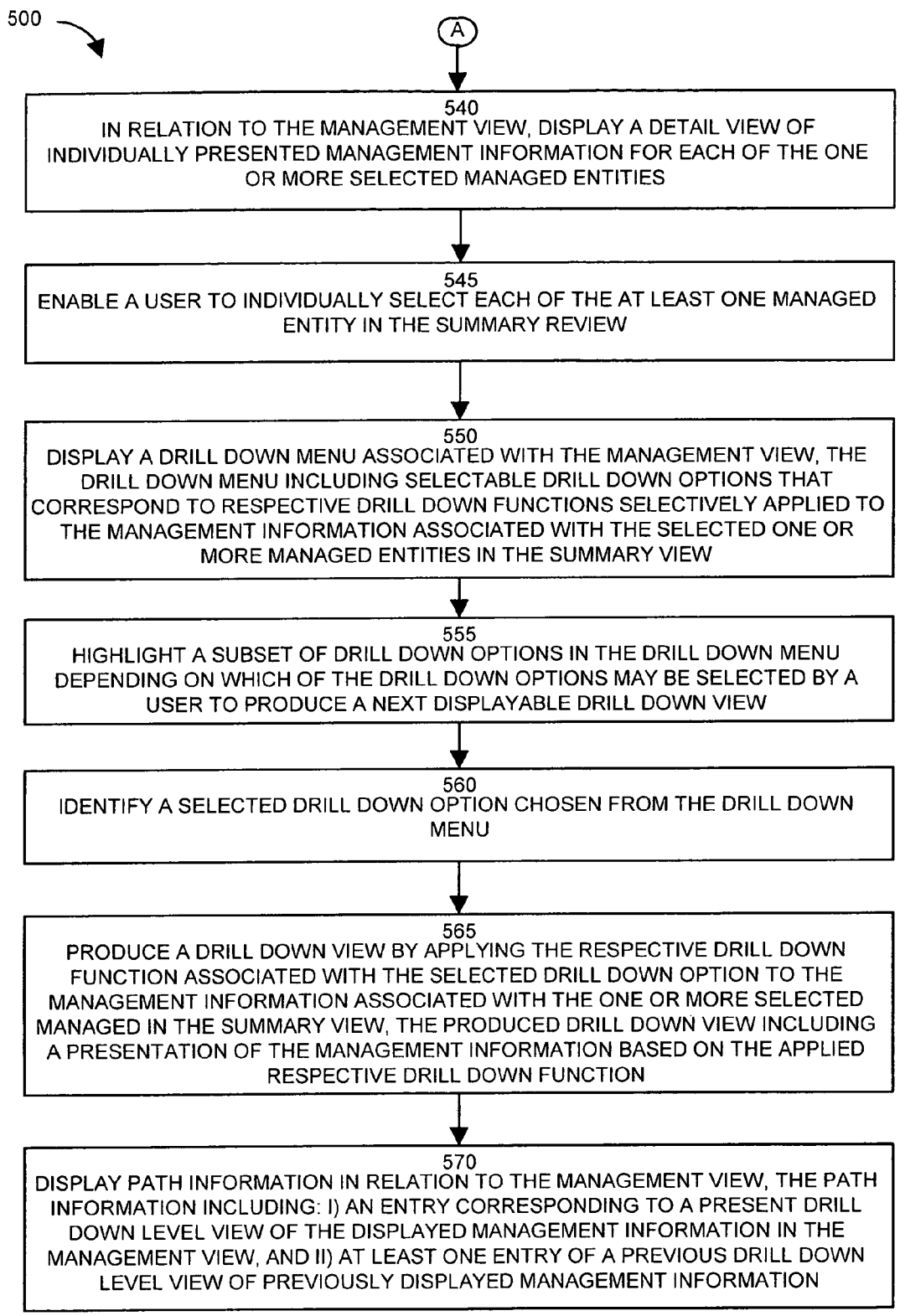

FIGS. 5 and 6 combine to form flowchart 500 illustrating processing steps performed by resource manager 120 in accordance with a more specific example embodiment of the invention. As discussed, resource manager 120 enables user 108 of the management station computer system 110 to display a management information view 170 of management information (e.g., free space information, alert information, performance information, etc.) associated with one or more selected managed entities 420 of network 100.

In step 505 of FIG. 5, resource manager 120 maintains a relational database 125 of managed objects 210 associated with managed entity icons (e.g., icons listed hierarchical arrangement of icons 182) corresponding to managed entities of the storage area network 110. The managed objects 210 include information such as foreign keys referencing other related-managed objects 210. Based on use of the managed objects, the resource manager identifies management information associated with each of one or more selected managed entity.

In step 510, resource manager 120 displays managed entities (e.g., host servers, storage arrays, databases, volumes, ports, etc.) associated with network 100 in hierarchical arrangement of icons 182. As discussed, a user 108 may select one or more icons 182 for which to display management information.

In one application, a user 108 may traverse the hierarchy of icons 182 (or managed entities) by clicking on successively more detailed information with respect to a particular icon. For example, a user may click on a "host" icon in the hierarchical arrangement of icons 182 to display other managed sub-entities associated with the host such as corresponding databases, files systems, etc. The user may click on a "database" icon to view specific databases associated with the host, and so on. Thus, a user may initially drill down via use of the hierarchical arrangement of icons 182 to identify a managed entity for which to display management information.

In step 515, resource manager 120 generates a visual display region 440 (such as user selectable checkboxes) in relation to managed entity icons in the hierarchical arrangement of icons 182. A user 108 may select an icon in the hierarchy of icons 182 by clicking on a corresponding visual display region 440 associated with the icon. Such an input selection by a user 108 identifies which managed entities of the network the user wishes to display management information. For example, as shown in FIG. 4, a user 108 may select multiple "storage array" icons 410-2, 410-3, 410-4, 410-5 under "storage systems" icon 410-1 to view corresponding free space management information associated with the multiple selected storage arrays (ID #s).

In addition to selecting managed entities for which to display management information, the user 108 selects a type of management view 170 in which to display management information associated with selected managed entities. For example, the user 108 may select a type of view by selecting an entry in a corresponding pull-down menu.

In step 520, the resource manager 120 of the graphical user interface 150 receives the selection of a type of management view in which to display management information.

In step 525, the resource manager 120 retrieves corresponding managed objects 210 stored in the database 125 associated with the selected one or more managed entity icons to retrieve pertinent management information. For example, if a user selects a management view such as "free space" mode, the resource manager retrieves free space information from the retrieved managed objects 210 for generating management information view 170.

In step 530, based on the selection of a type of management view 170 for displaying the management information, the resource manager 120 applies a corresponding display function to the management information in order to generate the management information view 170 associated with the selected one or more managed entities of the network 100.

In step 535, after applying the display function, the resource manager displays summary view 184 on a portion of a display screen 130. As discussed, summary view 184 includes graphically presented management information associated with the selected one or more managed entities in the network 100. In one application, the summary view 184 includes a single graph of collective management information associated with the multiple selected managed entities associated with the network 100. For example, a user may select multiple storage arrays for which to display free space management information. In such an instance, the resource manager 120 may display a single graph identifying allocated space, available mapped space, and available unmapped space associated with multiple storage arrays of a storage area network 100.

In step 540, the resource manager displays a detail view 186 including individually presented management information for each of the one or more selected managed entities. The detail view 186 may include individual entries 415 of management information for each of the selected storage arrays in the above example. Displaying the collective management information in the summary view 184 and also providing individual management information in entries 415 of the detail view 186 enables a user to more quickly assess whether to continue drilling down with respect to the selected managed entities collectively or individually.

In step 545, the resource manager 120 enables a user to individually select each of one or more entries 415 in the detail view 186. For example, entries 415 in detail view 186 may be selected by clicking on a corresponding input fields 425.

In step 550, the resource manager 120 displays a drill down menu 188 associated with the management information view 170. As mentioned, the drill down menu 188 includes selectable drill down options 420 that correspond to respective drill down functions that may be selectively applied to the management information associated with the selected one or more managed entities in the detail view 186.

In step 555, the resource manager 120 highlights a subset of drill down options 420 in the drill down menu 188 depending on which of the drill down options 420 may be selected by a user 108 to produce a next displayable drill down view (e.g., management information view 170) for selected entries 415 of detail view 186. In one embodiment, the drill down menu 188 includes at least two sets of selectable drill down options 420. For example, a first set of selectable drill down options 420 (e.g., HBA, Storage, Pool, Port/Storage Group, Unallocated devices) relates to storage features of a storage area network 100. A second set of drill down options 420 (e.g., database instance, database file, file system, volume group and host) relates to host features of the storage area network 100.

In step 560, the resource manager 120 identifies a selected drill down option 420 chosen by user 108 from the drill down menu 188. For example, a user clicks on a highlighted drill down option 420 in the drill down menu 188 that shall be applied to selected entries 415 in the detail view 186 of management information view 170.

In step 565, in response to identifying a selected drill down option 420 by user 108, the resource manager 120 produces a drill down view by applying the respective drill down function associated with the selected drill down option 420 to the selected entries 415 in detail view 186. The resource manager 120 displays the newly produced drill down view in place of a previously displayed management information view 170. Thus, management information view 170 is updated with a new drill down view each time a user drills down via selection of a drill down option 420.

In step 570, the resource manager 120 of the graphical user interface displays path information 450 in relation to a management information view 170. For example, each time a user drills down to a next lower level of management information associated with one or more selected managed entities, a new entry is added to the path information 450 to identify a successive drill down view. The path information 450 may include one or more entries corresponding to a previous drill down views of the displayed management information in the management view 170. Based on selection of a particular entry (e.g., clicking on a word identifying a drill down level) in the displayed path information 450, a user may quickly revert back to a previous drill down level view. This will be discussed in more detail later in the specification.

Thus, referring to FIG. 4, a particular embodiment of the invention includes a display function supporting allocation of different portions of a display screen 130 for different management functions. For example, a first portion of the display screen 130 includes a hierarchy of selectable icons 182 representing managed entities of a storage area network 100. A second portion of the display screen 130 includes a summary view 184 including collective management information associated with selected managed entities of the storage area network 100. A third portion of the display screen 130 includes a detail view 186 including separately listed management information for each of the one or more selected managed entities of the storage area network 100. A fourth portion of the display screen 130 includes the drill down menu 188 for applying one of multiple drill down options 420. Lastly, a fifth portion of the display screen includes path information 450 identifying presently and previously displayed drill down views so that a user may quickly revert back to a previously displayed drill down view.

FIGS. 7-18 are screenshots illustrating use of the graphical user interface 150 generated by resource manager 120 for displaying management information to a user 108 on display screen 130. In general, the series of screenshots show how a user 108 may drill down and view different types of management information associated with selected managed entities in hierarchical arrangement of icons 182.

Figure 7:
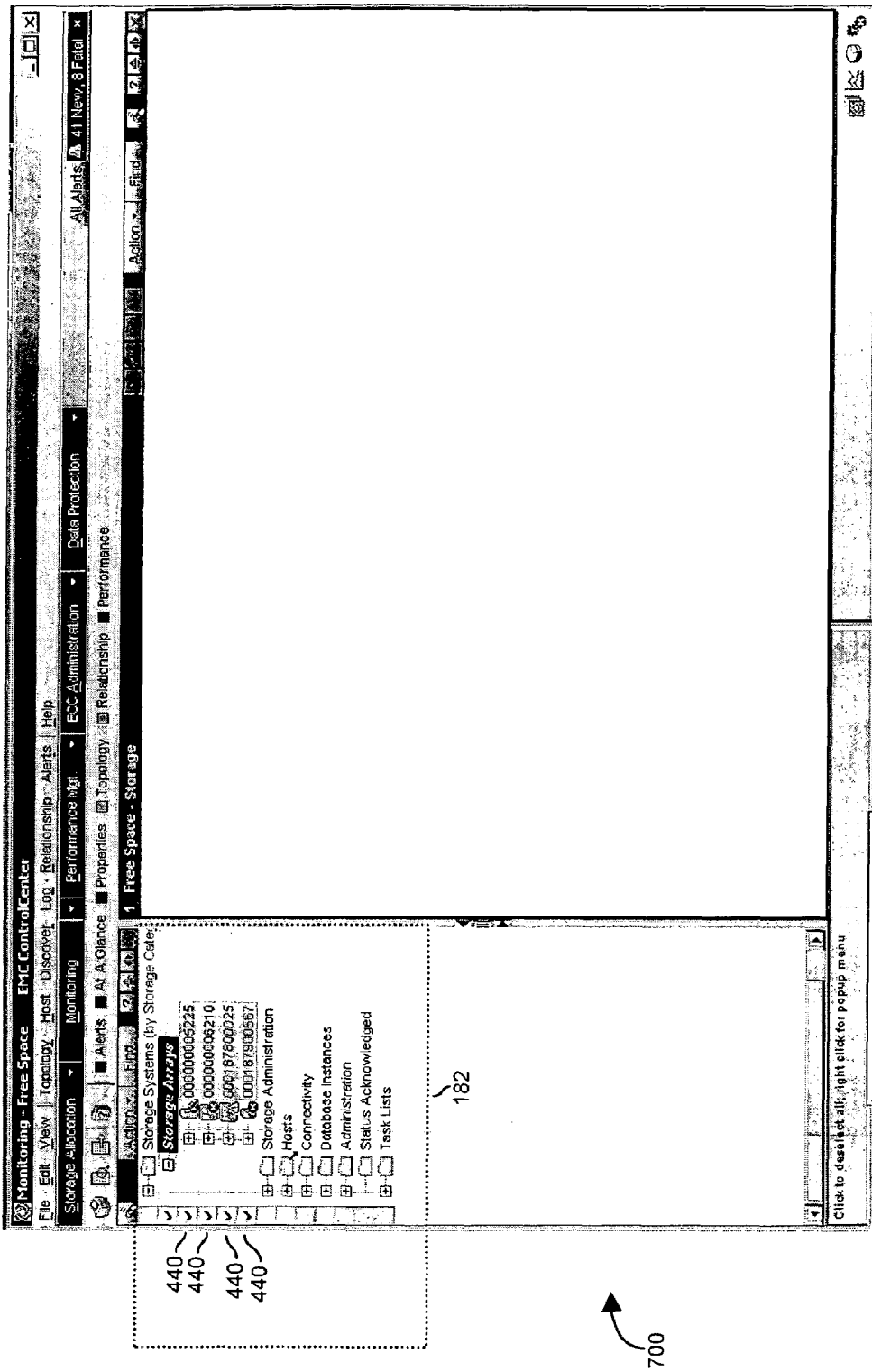
FIG. 7 is a screenshot illustrating selection of managed objects for which to display management information according to an embodiment of the invention.

FIG. 7 is a screenshot 700 illustrating selection of managed objects for which to display management information according to an embodiment of the invention. As shown, a user 108 clicks on input fields 440 (such as toggling on/off checkboxes) to select storage arrays 000000005225, 000000006210, 000187800025, and 000187900567. In response to selecting these managed entity icons, resource manager 120 produces the screenshot 800 in FIG. 8 including corresponding table 810.

Figure 8:
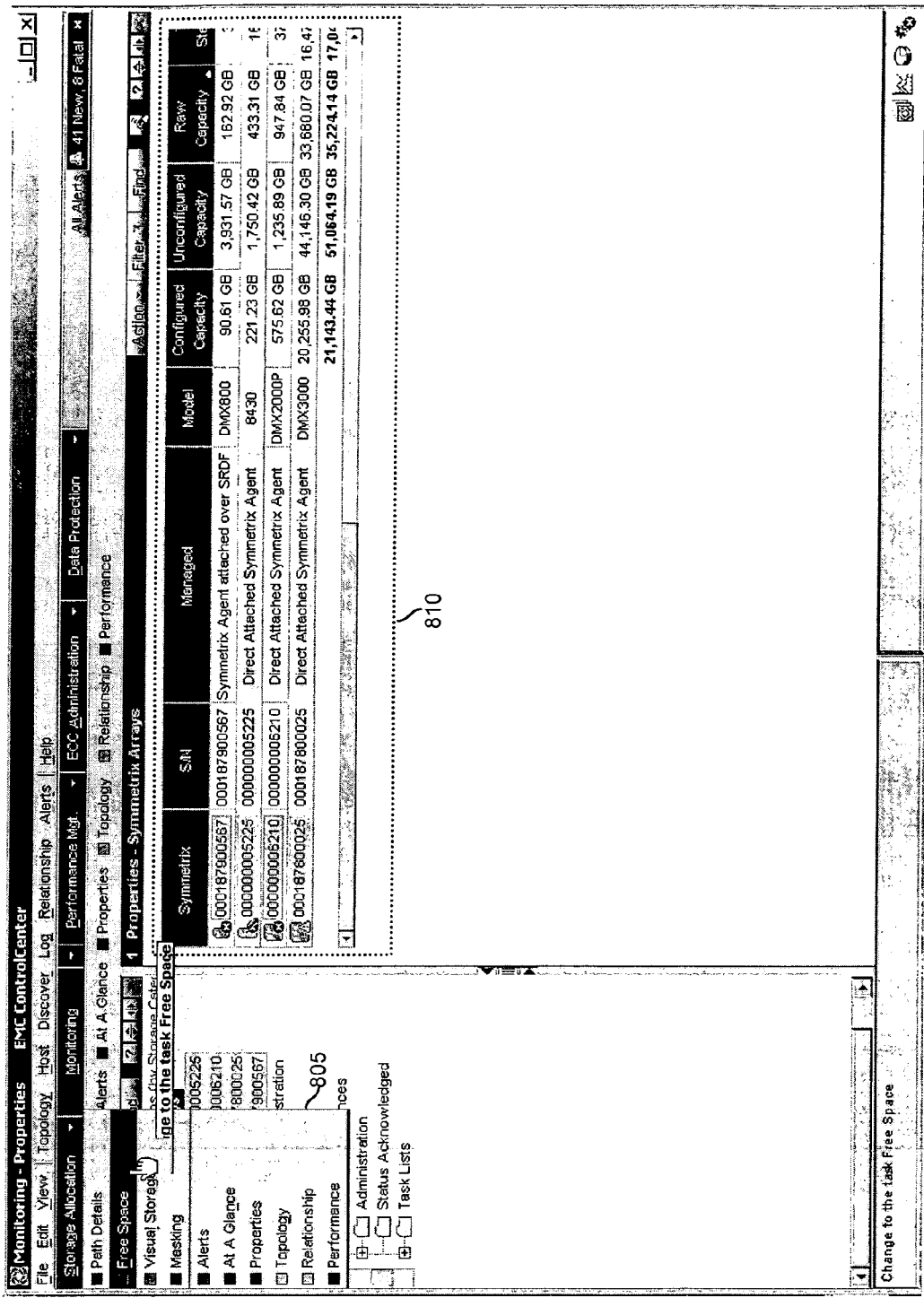
FIG. 8 is a screenshot illustrating selection of a view type in which to display management information associated with the selected managed entities according to an embodiment of the invention.

FIG. 8 is a screenshot 800 illustrating selection of a "view type" in which to display management information associated with the selected storage arrays (of FIG. 7) according to an embodiment of the invention. For example, user 108 selects a free space view from pull-down menu 805 for displaying free space management information associated with selected storage arrays 000000005225, 000000006210, 000187800025, and 000187900567. Prior to selecting the "free space" option in pull-down menu 805, the resource manager 120 produces a detailed view of management information associated with the selected storage arrays. For example, table 810 includes detailed information such as serial number, model configured capacity, etc. associated with each selected storage array. After selecting the free space option in pull-down menu 805, resource manager 120 produces screenshot 900 in FIG. 9.

Figure 9:
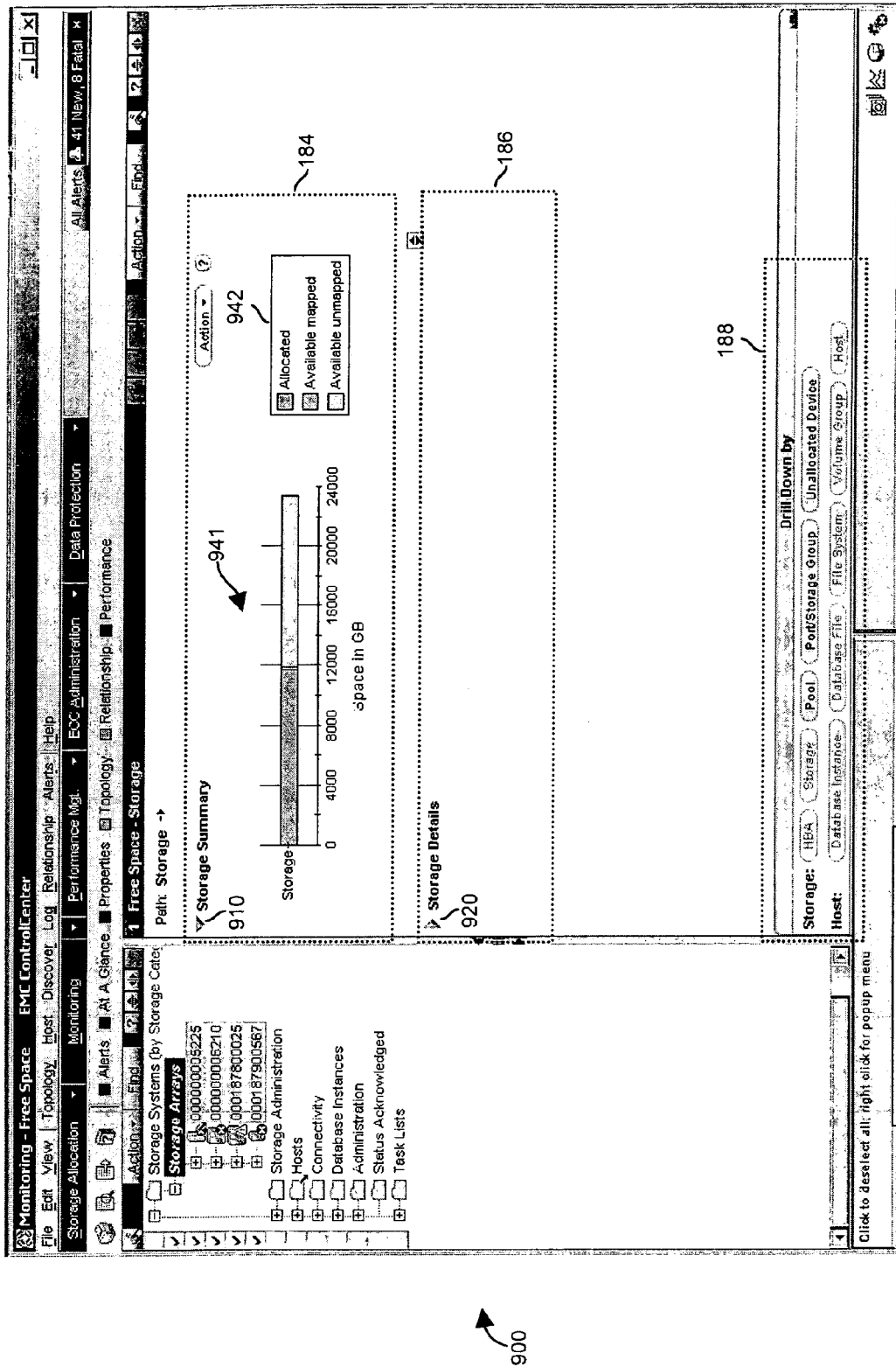
FIG. 9 is a screenshot illustrating free space management information associated with the selected managed entities according to an embodiment of the invention.
Figure 10:
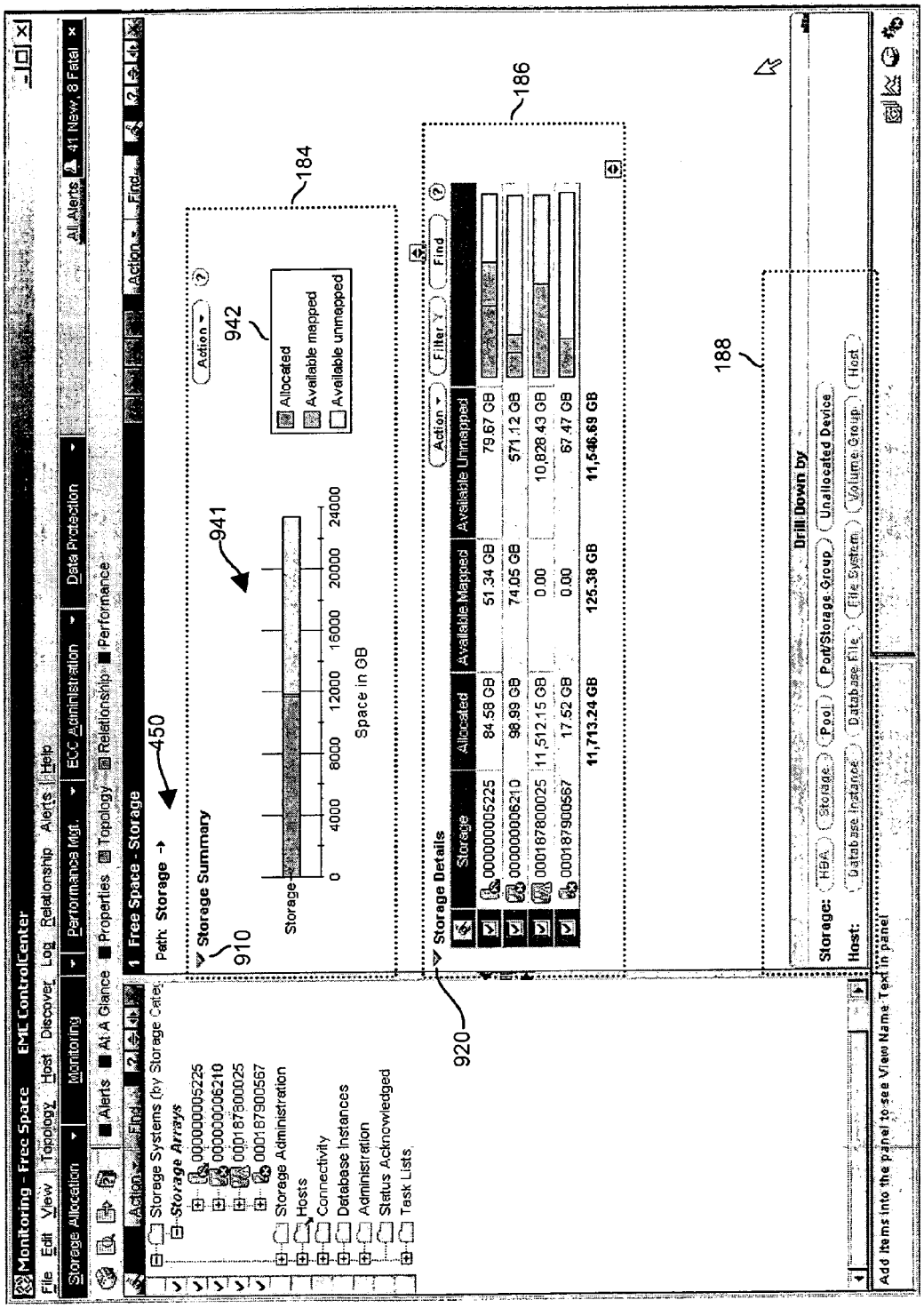
FIG. 10 is a screenshot illustrating a summary view as well as detail view of management information associated with the selected managed entities according to an embodiment of the invention.

FIG. 9 is a screenshot 900 illustrating free space management information associated with the selected storage arrays according to an embodiment of the invention. As previously discussed, management information view 170 includes summary view 184, detail view 186, and drill down menu 188. Summary view 184 includes a graph 941 of collective free space management information associated with the selected storage arrays. Based on different degrees of shading, legend 942 indicates which portions of storage are allocated, available mapped, and available unmapped. As shown, detail view 186 is collapsed (e.g., detail view 186 is empty). Clicking on icon 920 causes detail view 186 to expand as shown in FIG. 10. Clicking on icon 920 again causes detail view 186 to expand. Thus, a user 108 may control whether to expand/collapse detail view 186 by clicking on icon 920.

FIG. 10 is a screenshot 1000 illustrating summary view 184 as well as a detail view 186 of management information associated with the selected storage arrays 000000005225, 000000006210, 000187800025, and 000187900567 according to an embodiment of the invention. As shown, each entry 415 in detail view 186 includes a listing of corresponding management information associated with a given selected managed entity.

Similar to functions associated with icon 920, a user may click on icon 910 to expand and collapse contents of summary view 184.

Figure 11:
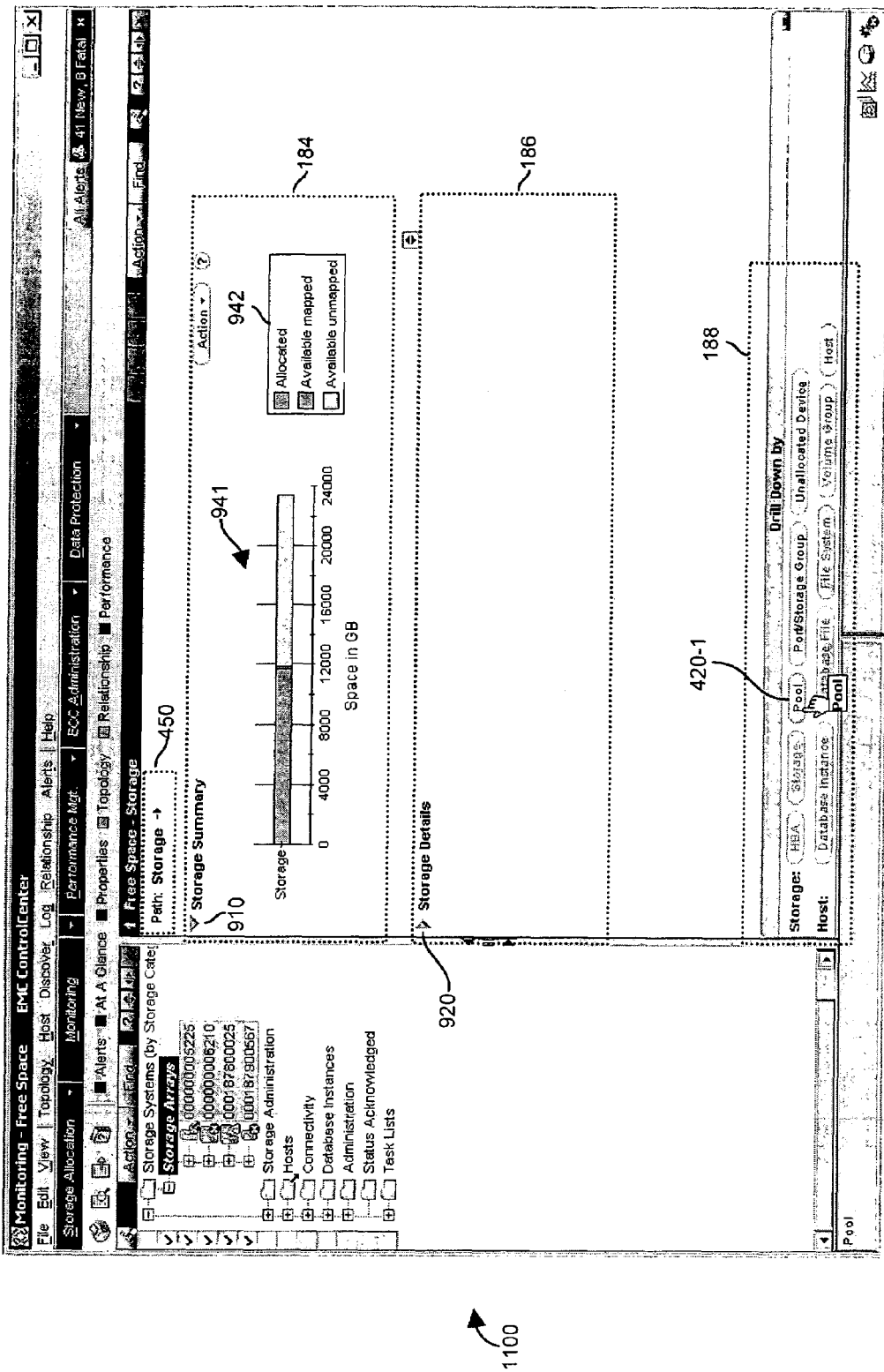
FIG. 11 is a screenshot illustrating selection of a "pool" drill down option for selected management information according to an embodiment of the invention.

FIG. 11 is a screenshot 1100 illustrating selection of a "pool" drill down option 420-1 for the selected management information according to an embodiment of the invention. For example, a user 108 may select pool option 420-1 in drill down menu 188 to drill down with respect to pool information. After selecting the pool drill down option 420-1, the free space management information view 170 will include a free space pool for all four selected storage systems as shown in screenshot 1200 of FIG. 12.

Figure 12:
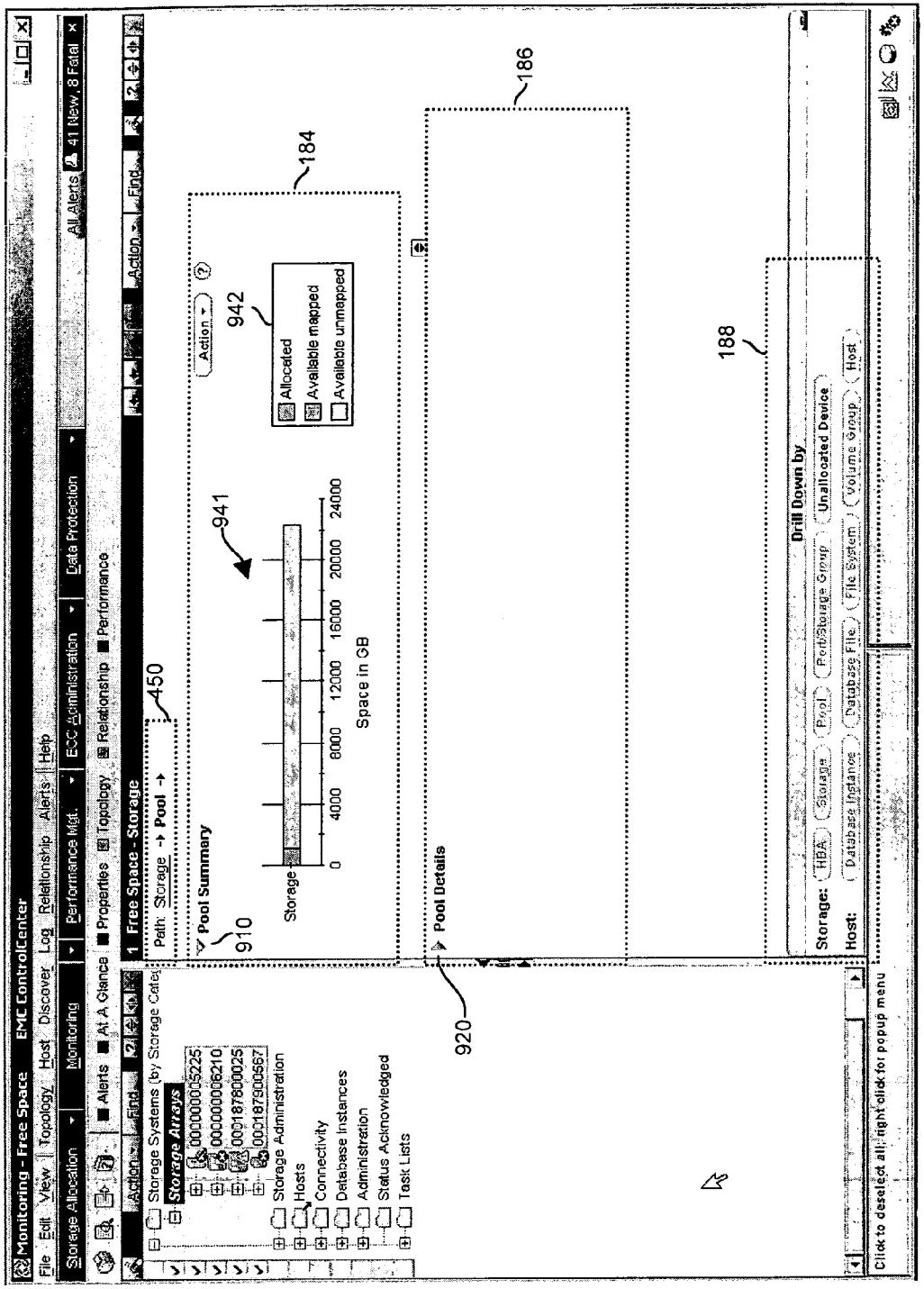
FIG. 12 is a screenshot illustrating a display of management information after selecting the "pool" drill down option in FIG. 11 according to an embodiment of the invention.

FIG. 12 is a screenshot 1200 illustrating management information view 170 after selecting the pool drill down option 420-1 in FIG. 11 according to an embodiment of the invention. As shown, detail view 186 is collapsed. As mentioned, the detail view may be expanded by clicking on icon 920.

Note that path information 450 in screenshot 1200 includes two entries, namely, "storage" and "pool" indicating previous and present drill down levels. For example, rightmost entry in path information 450 or "pool" identifies the present drill down level of management information view 170. "Storage" indicates a previous drill down level (e.g., screenshot 1000) and corresponding management information view 170. Note that clicking on storage will cause management information view 170 to revert back to that shown in screenshot 1000 of FIG. 10.

Figure 13:
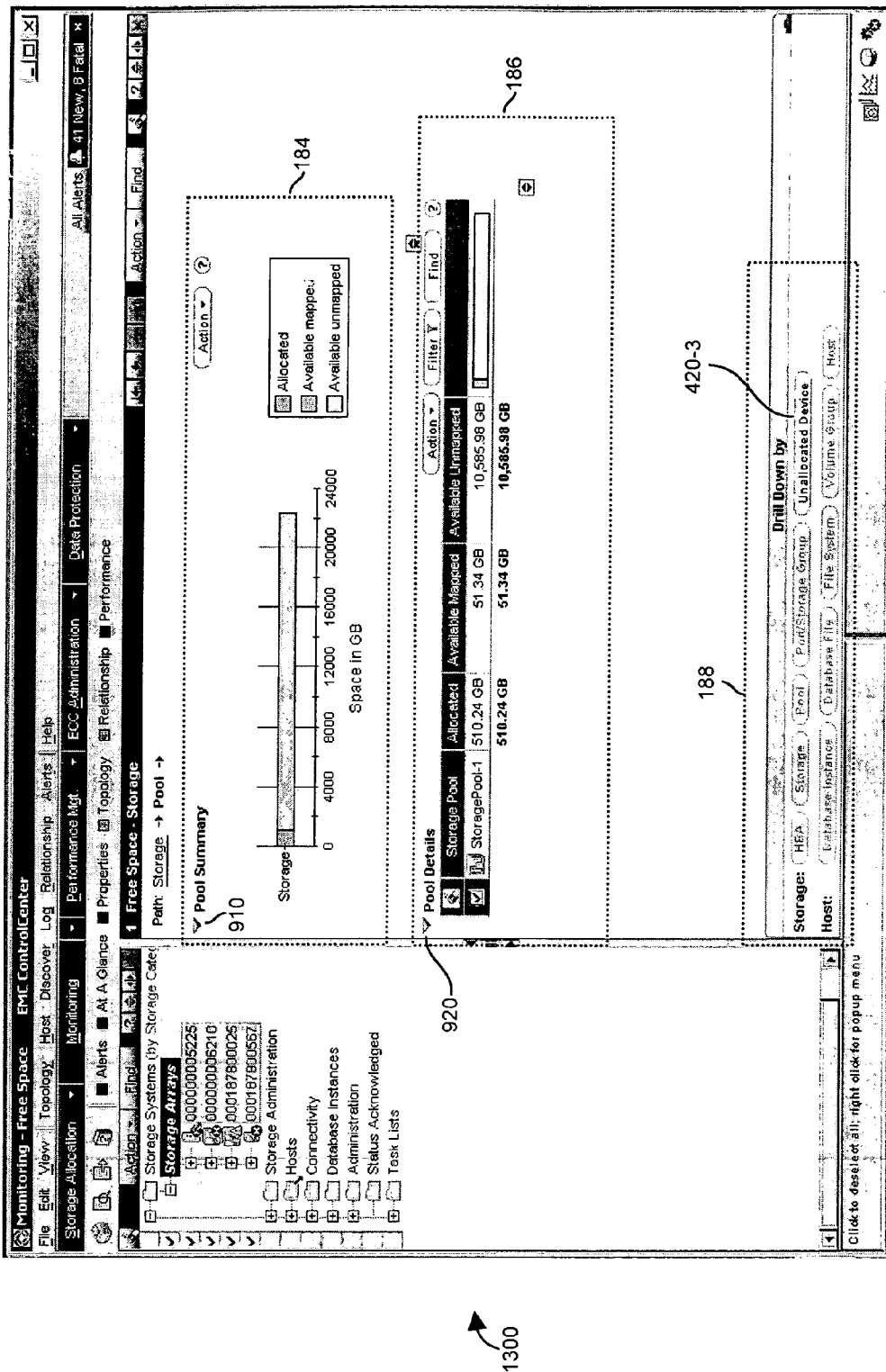
FIG. 13 is a screenshot including an expanded pool details view of management information according to an embodiment of the invention.

However, in the present example in FIG. 12, user 108 clicks on icon 920 to expand detail view 186 as shown in FIG. 13.

FIG. 13 is a screenshot including an expanded pool detail view 186 of management information view 170 according to an embodiment of the invention. Detail view 186 illustrates details of free space information for pools. For example, in the case as shown, there is only one pool for all four selected storage arrays. Note that only one drill option (namely, unallocated device drill down option 420-3) is highlighted in the drill down menu 188 because it is the only pertinent drill down option available for further drilling down with respect to detail view 186 of management information view 170. Instead of drilling down further in the present example, the user clicks on "storage" of path information 450 to revert back to a previous drill down screen.

Figure 14:
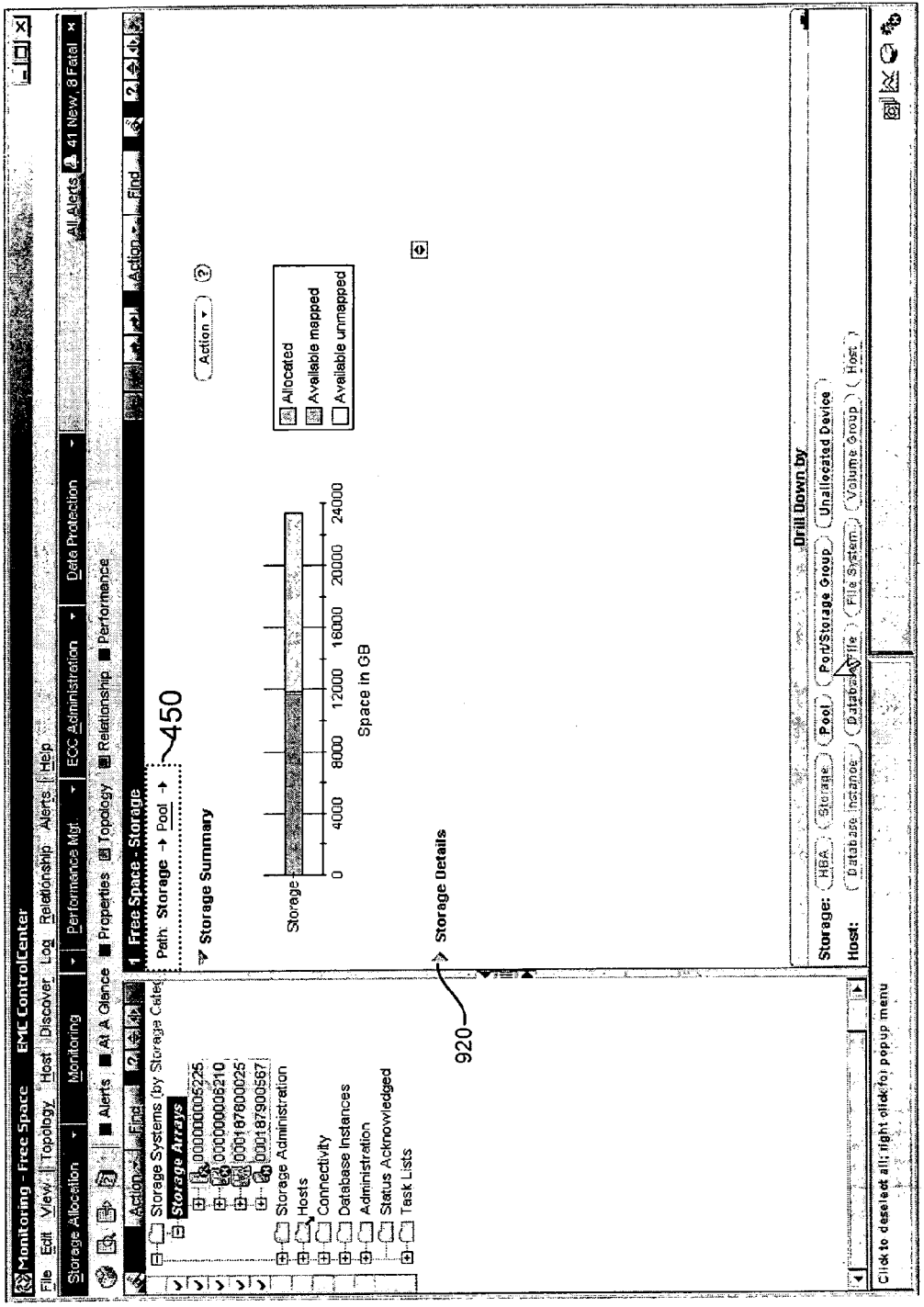
FIG. 14 is a screenshot illustrating a technique of traversing back to a previously displayed drill down view of management information based on use of path information according to an embodiment of the invention.

FIG. 14 is a screenshot illustrating a technique of reverting back to a previously displayed drill down view of management information according to an embodiment of the invention. For example, after clicking on the word "storage" of path information 450 in FIG. 13, resource manager 120 produces screenshot 1400 as illustrated in FIG. 14. In the present example, the user clicks on icon 920 in FIG. 14 to expand the detail view 186 again.

Figure 15:
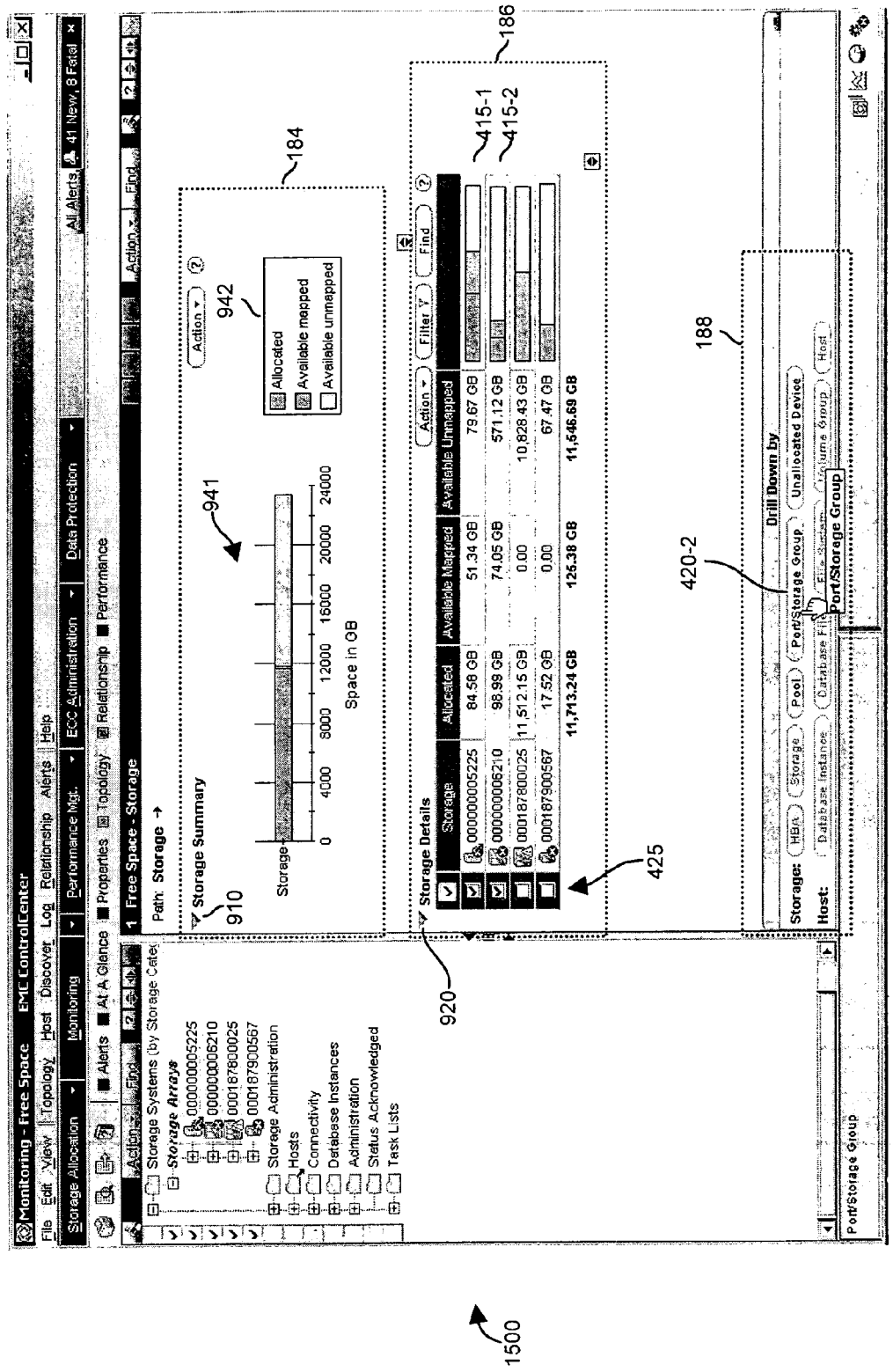
FIG. 15 is a screenshot illustrating selection of a "port/storage group" drill down option for the selected management information according to an embodiment of the invention.

FIG. 15 is a screenshot illustrating expansion of detail view 186 and selection of a port/storage drill down option 420-2 for certain selected storage arrays 000000005225 and 000000006210 according to an embodiment of the invention. For example, the user 108 first clicks on checkboxes of input field 425 associated with entries 415-1 and 415-2 of detail view 186. Checkmarks in checkboxes illustrate that a managed entity or entry 415 has been selected. Thereafter, user 108 clicks on port/storage group drill down option 420-2 to drill down further with respect to selected entries 415-1 and 415-2 (or storage arrays 000000005225 and 000000006210).

Figure 16:
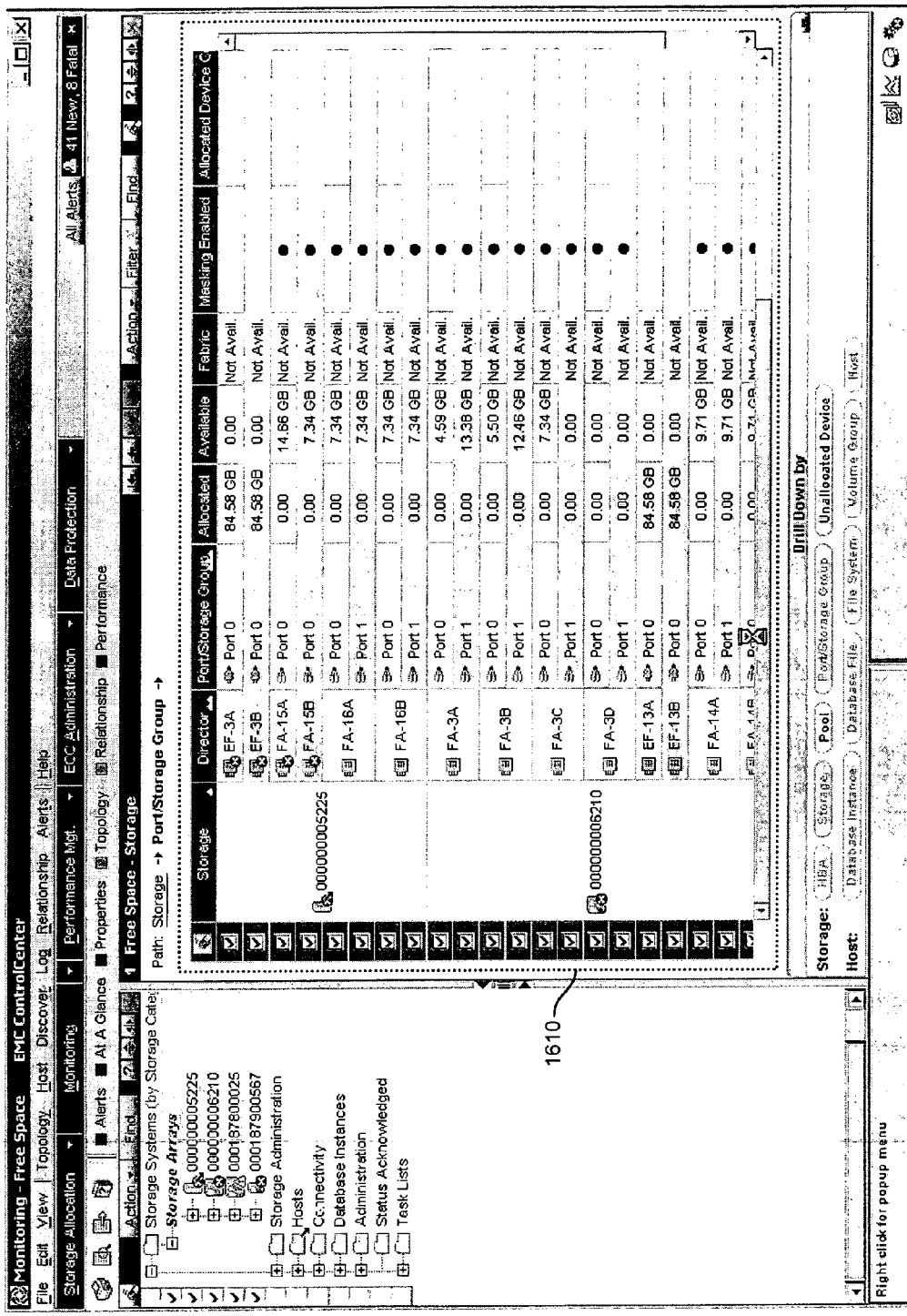
FIG. 16 is a screenshot including an expanded port/storage group detail view of management information according to an embodiment of the invention.

FIG. 16 is a screenshot 1600 including an expanded port/storage group details view of management information according to an embodiment of the invention. More specifically, table 1610 is a free space management information view based on ports/storage group for each selected storage array.

Figure 17:
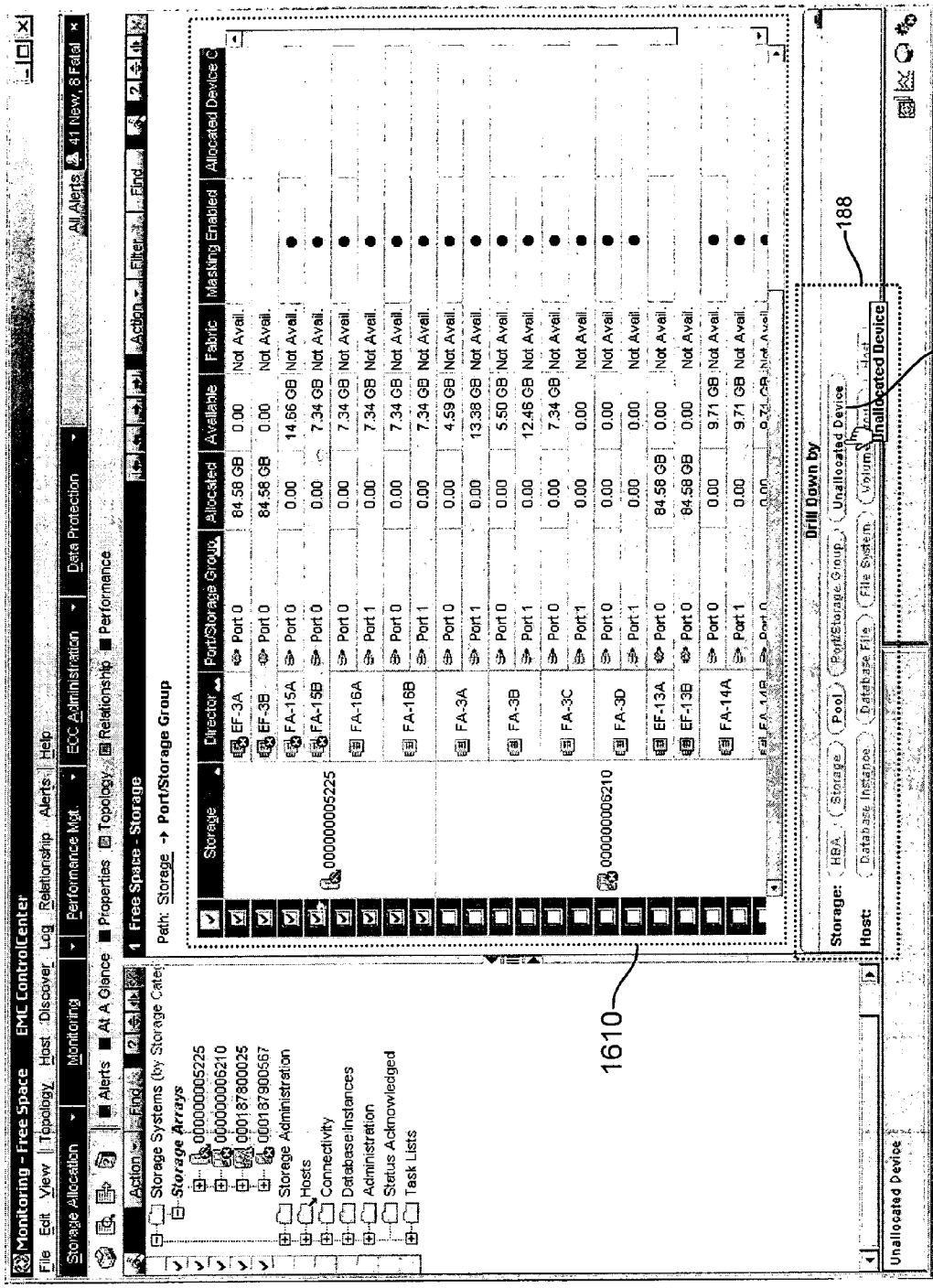
FIG. 17 is a screenshot illustrating selection of a "unallocated device" drill down option for the selected management information according to an embodiment of the invention.

FIG. 17 is a screenshot 1700 illustrating selection of a unallocated device drill down option 420-3 for the selected management information according to an embodiment of the invention. However, prior to drilling down further with respect to selected managed entities, the user 108 selects only checkboxes associated with storage array 000000005225 (or deselects checkboxes associated with other storage arrays) for drilling down further by unallocated device drill down option 420-3. As mentioned, this technique of selecting displayed entries in a management information view 170 enables a user 108 to narrow a scope of successive drill downs.

Figure 18:
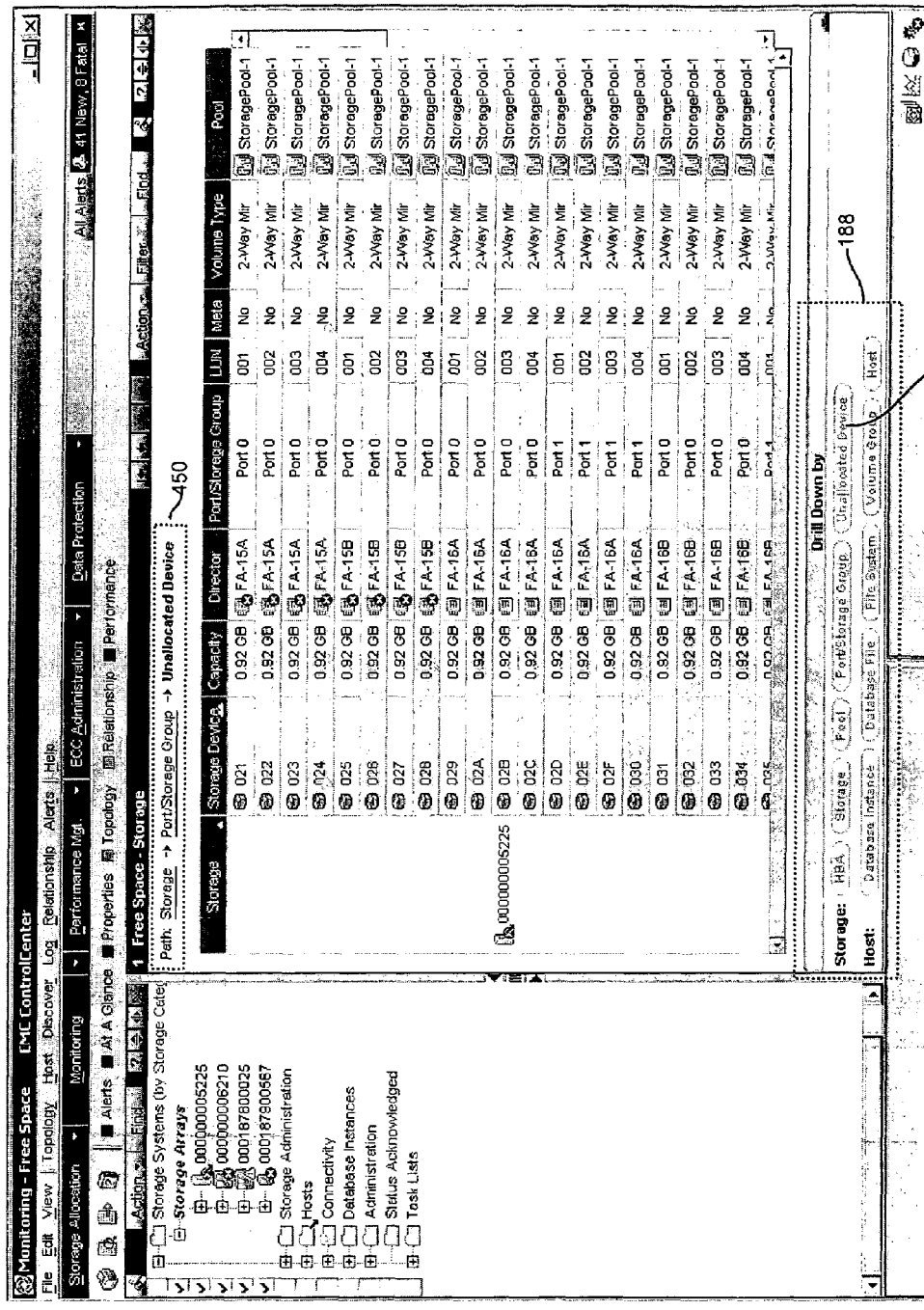
FIG. 18 is a screenshot including an unallocated device detail view of management information according to an embodiment of the invention.

FIG. 18 is a screenshot 1800 illustrating results of the free space drill down by unallocated devices 420-3 for the selected ports in FIG. 17 according to an embodiment of the invention. Note that no drill down options 420 are highlighted because the user 108 has reached a lowest drill down view for selected entities. Also, note that path information 450 of screenshot 1800 includes selectable entries (e.g., "storage", "port/storage group", "unallocated device") for redisplaying the previously discussed levels of drill down management information views.

FIGS. 19-24 are screenshots illustrating use of graphical user interface 150 to display management information on display screen 130 for user 108. In general, the series of screenshots show how a user 108 may drill down to view different types of management information associated with selected managed entities in hierarchical arrangement of icons 182. For this series of screenshots, user 108 selects the "at a glance" type of view to display management information. More details of the "at a glance" view and corresponding details of operation of the GUI explained herein may be found in co-pending application (Ser. No. 10/674,322 entitled "SYSTEM AND METHODS FOR PROCESSING AND DISPLAYING AGGREGATE STATUS EVENTS FOR REMOTE NODES," filed on an even date herewith, the entire contents and teachings of which are hereby incorporated herein by this reference in their entirety.

Figure 19:
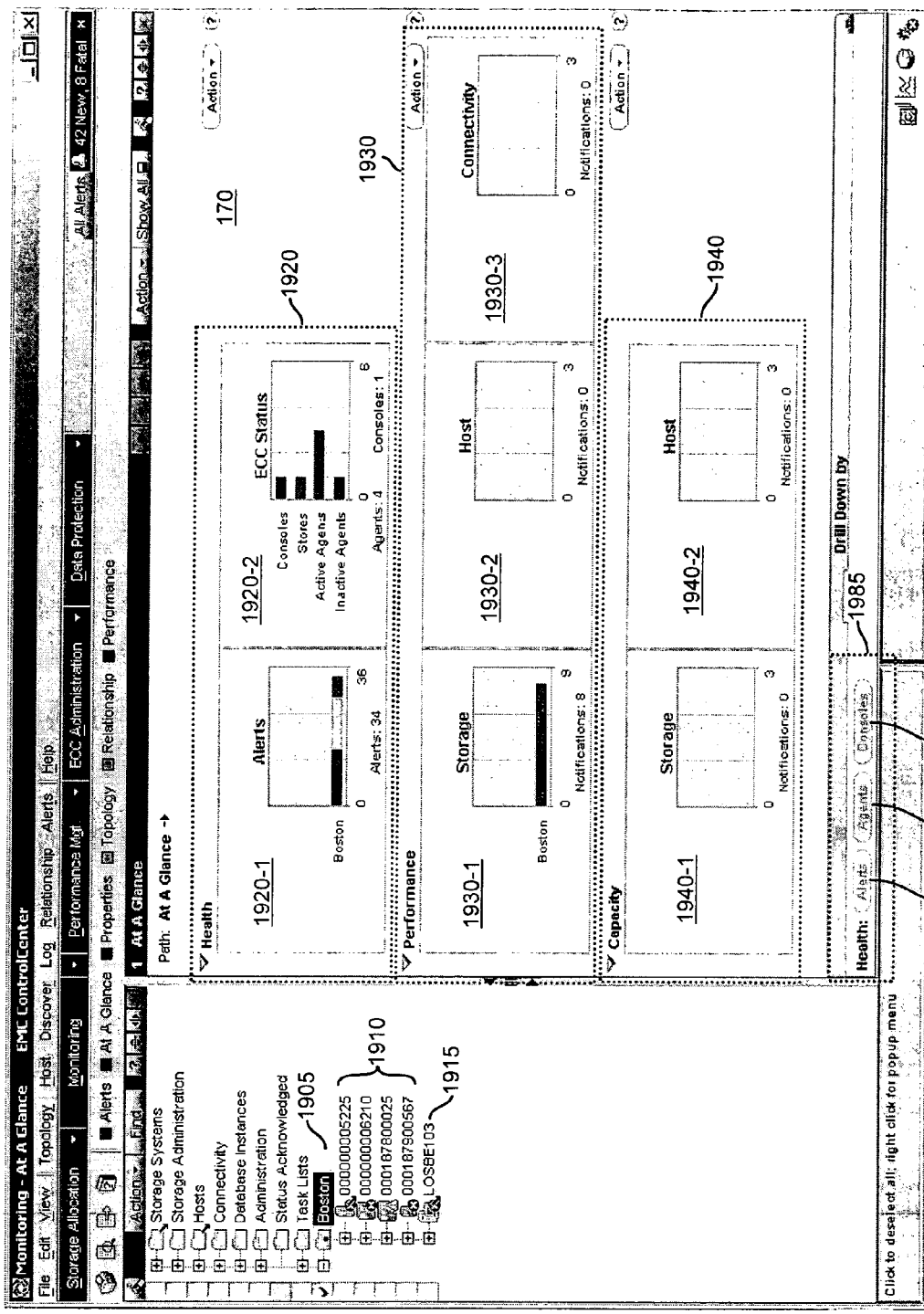
FIG. 19 is a screenshot illustrating an "at a glance" view of management information according to an embodiment of the invention.

FIG. 19 is a screenshot 1900 illustrating an "at a glance" view of management information according to an embodiment of the invention. As shown, user has selected icon 1905 (e.g., Boston folder) to display management information associated with host 1915 (e.g., LOSBE103), and storage arrays 1910 (e.g., 000000005225, 000000006210, 000187800025, and 000187900567). Management information view 170 includes health information view 1920 (e.g., alerts information 1920-1 and ECC status information 1920-2), performance information view 1930 (e.g., storage information 1930-1, host information 1930-2, and connectivity information 1930-3), and capacity information view 1940 (e.g., storage information 1940-1 and host information 1940-2). Prior to selection of a particular management information such as alert information 1920-1, ECC status information 1920-2, storage information 1930-3, etc., no drill down options 1999 are highlighted in drill down menu 1985.

Figure 20:
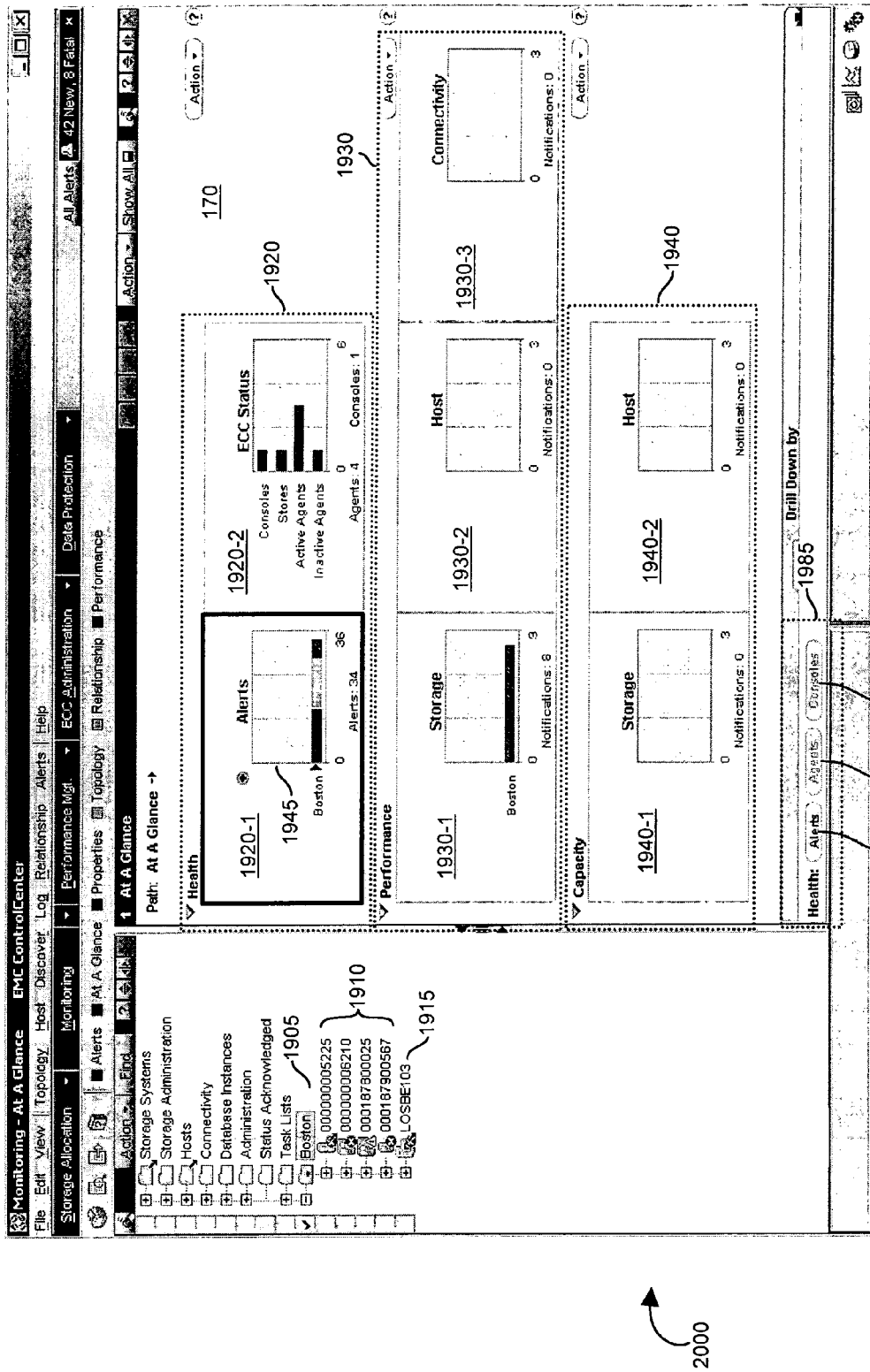
FIG. 20 is a screenshot illustrating selection of "health" management information and drilling down based on alerts according to an embodiment of the invention.

FIG. 20 is a screenshot 2000 illustrating selection of "health" management information and drilling down based on "alerts": drill down option according to an embodiment of the invention. For example, as shown, user 108 selects health information 1920-1 in which to drill down further. After selection of health information 1920-1 (e.g., by clicking on alerts graph 1945), the box encompassing alerts graph 1945 is highlighted to indicate that it has been selected. Resource manager highlights alerts drill down option 1999-1 in drill down menu 1985 to identify that it is a selectable drill down option for the selected management information. User selects the alerts drill down option 1999-1 to generate the management view 170 of management information shown in screenshot 2100 of FIG. 21.

Figure 21:
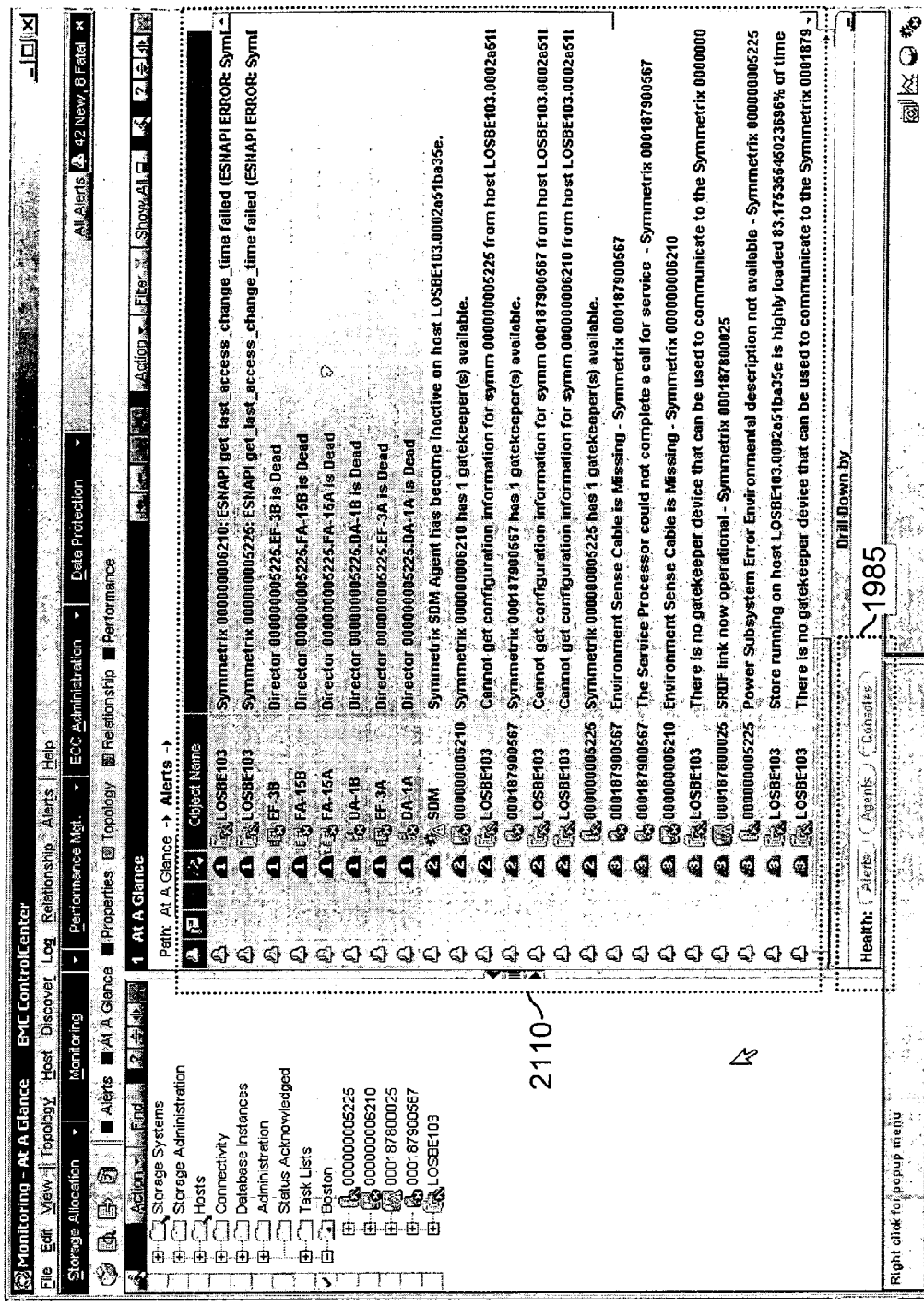
FIG. 21 is a screenshot illustrating a display of alert management information according to an embodiment of the invention.

FIG. 21 is a screenshot 2100 illustrating alert management information according to an embodiment of the invention. As shown, table 2110 includes a detailed summary of alerts associated with the selected Boston folder. Note that no drill down options 1999 are highlighted in drill down menu 1985.

Figure 22:
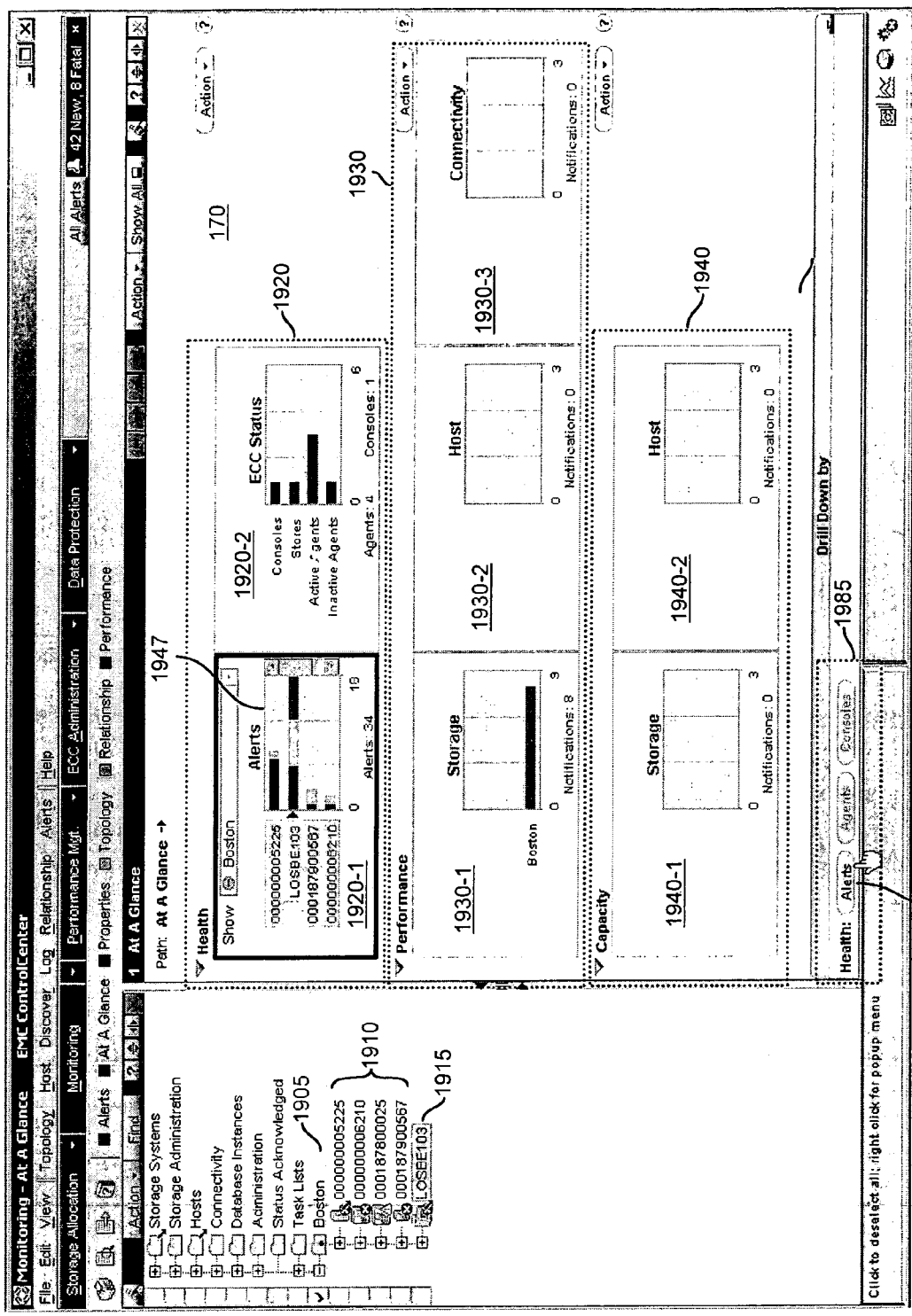
FIG. 22 is a screenshot illustrating expansion of a health management information view and selection of the "alert" drill down option according to an embodiment of the invention.

FIG. 22 is a screenshot 2200 illustrating expansion of a health management information view 1920 for alerts graph 1945 according to an embodiment of the invention. For example, a user 108 may expand the alerts graph 1945 in FIG. 19 to display the expanded alerts graph 1947 as shown in FIG. 22. In the present screenshot 2200, user 108 selects (e.g., clicks on) host LOSBE103 for drilling down based on a further selection of the "alert" drill down option 1999-1 in drill down menu 1985.

Figure 23:
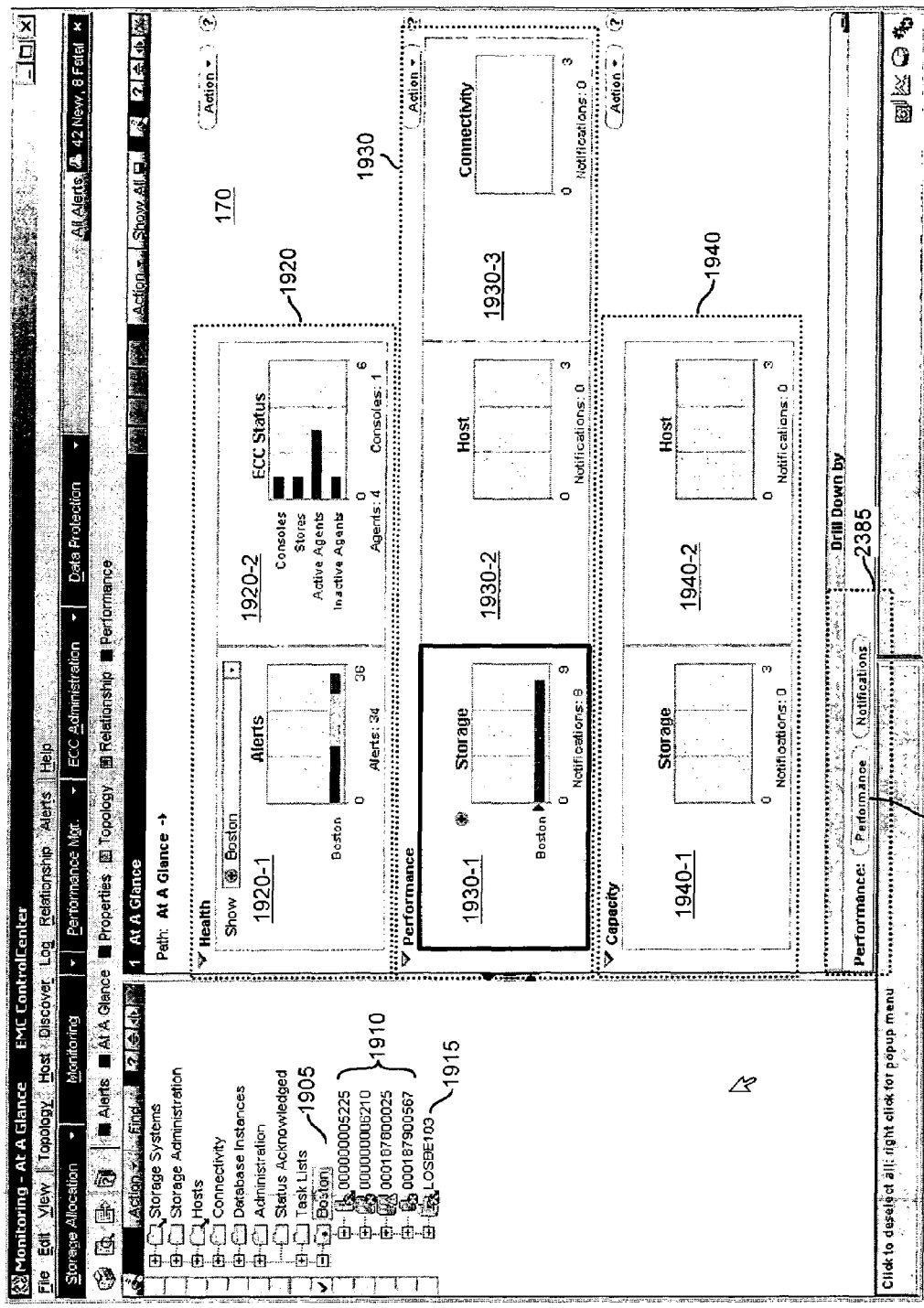
FIG. 23 is a screenshot illustrating selection of performance management information and selection of the "performance" drill down option according to an embodiment of the invention.

FIG. 23 is a screenshot 2300 illustrating selection of performance management information and selection of the "performance" drill down option according to an embodiment of the invention. For example, as shown, a user 108 may select performance information 1930-1 in which to drill down by further selecting "performance" drill down option 2999-1 in drill down menu 2385. In response to this series of selections, resource manager 120 generates and displays screenshot 2400 as shown in FIG. 24.

Figure 24:
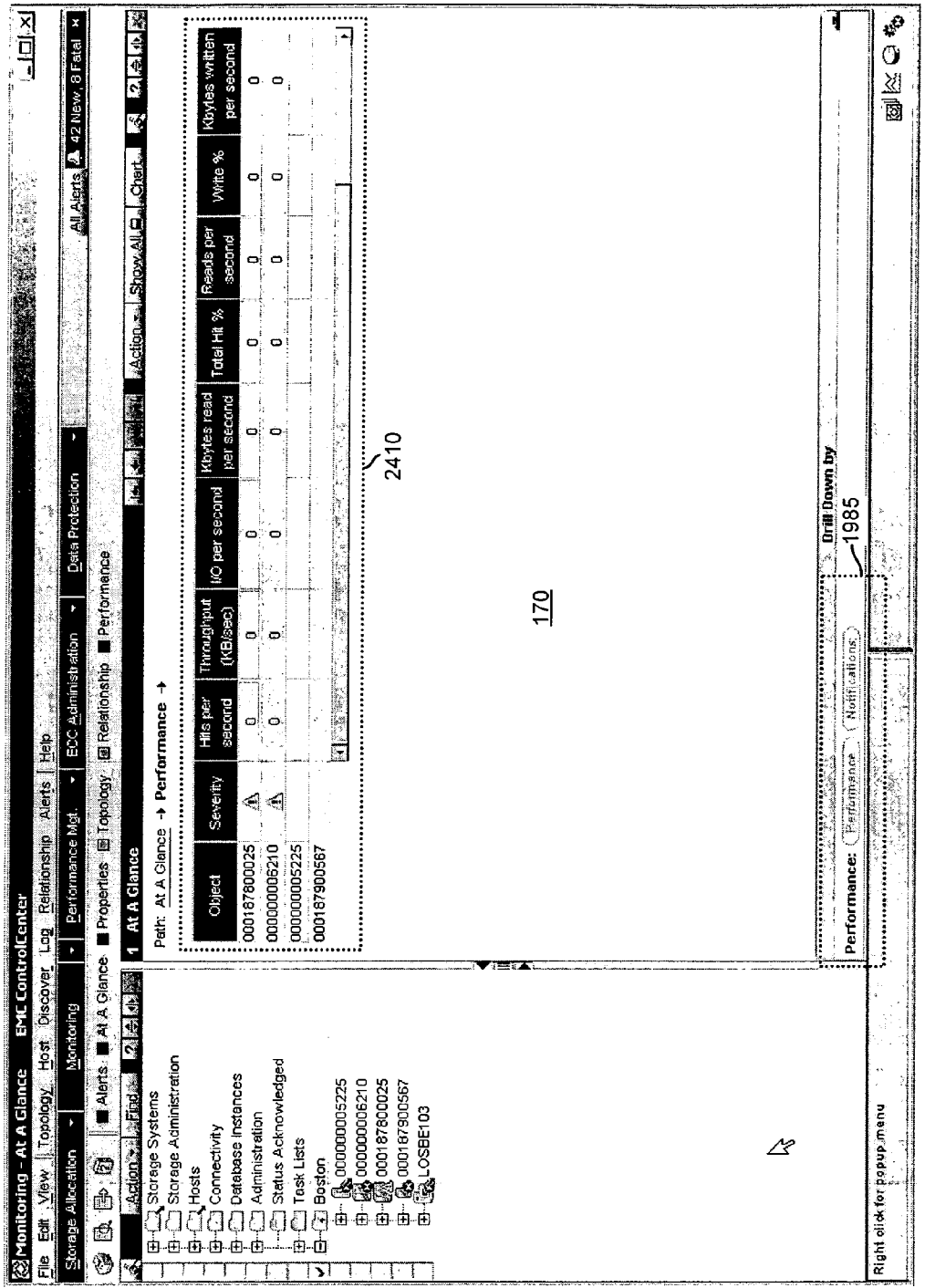
FIG. 24 is a screenshot illustrating performance management information according to an embodiment of the invention.

FIG. 24 is a screenshot 2300 illustrating performance management information according to an embodiment of the invention. As shown, management information view 170 includes table 2410 including performance management information associated with storage arrays of the selected Boston folder.

While this invention has been particularly shown and described with references to preferred embodiments thereof, it will be understood by those skilled in the art that various changes in form and details may be made therein without departing from the spirit and scope of the invention as defined by the appended claims. Such variations are intended to be covered by the scope of this invention. As such, the foregoing description of embodiments of the invention is not intended to be limiting. Rather, any limitations to embodiments of the invention are presented in the following claims.

What is claimed is:

1. A computer-implemented method to support displaying management information in a graphical user interface, the computer-implemented method comprising:
   receiving selection of multiple entries in a hierarchy, the selection including multiple managed entities in a network;
   displaying a management information view that includes management information associated with the multiple managed entities in the network;
   displaying a drill down menu associated with the management information view, the drill down menu including selectable drill down options that correspond to respective drill down functions selectively applied to the management information associated with the multiple managed entities;
      identifying a selected drill down option chosen from the drill down menu;
      producing a drill down view by applying the respective drill down function associated with the selected drill down option to the management information associated with the multiple managed entities, the produced drill down view including a presentation of the management information based on the applied respective drill down function;
      displaying the drill down view on the graphical user interface; and
      continuing to display the drill down menu even after producing the drill down view for selection of another drill down option from the drill down menu and further drilling down with respect to the produced drill down view; and
   displaying path information in relation to the management information view, the path information including: i) an entry corresponding to a present drill down level view of the displayed management information in the management view, and ii) at least one entry of a previous drill down level view of previously displayed management information;
   wherein the path information includes entries indicating a sequence of drill down options selected from the drill down menu to view the present drill down menu view; and
   wherein the at least one entry of the previous drill down level view may be selected by a user to change contents of the management information view back to a corresponding previously displayed management information view.

2. A computer-implemented method as in claim 1, wherein the respective drill down function associated with the selected drill down option identifies a particular category in which to drill down to a lower level with respect to the management information associated with the multiple managed entities.

3. A computer-implemented method as in claim 2, wherein displaying the drill down menu includes:
   displaying the drill down menu to include drill down options associated with managed entities in a storage area network, the drill down menu including at least one of the following drill down options: database, database file, file system,
   volume group, host device, HBA (Host Bus Adapter), storage device, pool, port/storage group, unallocated devices.

4. A computer-implemented method as in claim 1, wherein displaying the management information view includes:
   receiving a selection of a type of management information view in which to display management information associated with the multiple managed entities; and
   based on the selection of a type of management information view, applying a display function to the management information associated with the multiple managed entities in the network to graphically display the management information.

5. A computer-implemented method as in claim 1, wherein displaying a management information view includes:
   maintaining a database of managed objects associated with managed entity icons, the managed entity icons corresponding to managed entities of a storage area network; and
   upon detecting selection of the multiple managed entity icons for producing a management information view, retrieving multiple corresponding managed objects stored in the database associated with the selected multiple managed entity icons to identify the management information associated with the selection of the at least one managed entity icon.

6. A computer-implemented method as in claim 1 further comprising:
   allocating a first portion of a display screen to include the hierarchy, the hierarchy including selectable icons representing managed entities of a storage area network;
   allocating a second portion of the display screen to include the management information view associated with the multiple managed entities in the network;

allocating a third portion of the display screen to display a detailed view including separately listed entries of management information for each of the multiple managed entities in the network displayed in the second portion of the display screen; and allocating a fourth portion of the display screen to include the drill down menu.

7. A computer-implemented method as in claim 1 further comprising:

in relation to the management information view including management information associated with the multiple managed entities in the network, displaying a detailed view of individually presented management information for each of the multiple managed entities.

8. A computer-implemented method as in claim 7, wherein the management information in the management information view includes a multi-axis graph of collective management information associated with multiple managed entities of the network.

9. A computer-implemented method as in claim 7 further comprising:

providing corresponding icons on the display screen to enable a user to selectively hide the management information view.

10. A computer-implemented method as in claim 1, wherein the management information in the management information view includes a multi-axis single graph of collective management information associated with the multiple managed entities.

11. A computer-implemented method as in claim 1 further comprising:

highlighting a subset of drill down options in the drill down menu depending on which of the drill down options may be selected by a user to produce a next displayable drill down view.

12. A computer-implemented method as in claim 1 further comprising:

displaying a hierarchy of managed entity icons that may be traversed based on use of a drill down technique; and in relation to at least a portion of the managed entity icons in the hierarchy, providing a display region in relation to the managed entity icons to receive an input selection by a user of which management information to display for multiple selected managed entities of the network.

13. A computer-implemented method as in claim 1, wherein the drill down menu includes at least two sets of selectable drill down options, a first set of selectable drill down options related to storage features of a storage area network, a second set of drill down options related to host features of the storage area network.

14. A computer-implemented method as in claim 1 further comprising:

in relation to the management information view including management information associated with the at least one managed entity in the network, displaying a detailed view of individually presented management information for each of the multiple managed entities;

enabling a user to individually select each of the multiple managed entities in the detailed view; and wherein producing a drill down view further includes applying the respective drill down function to management information associated with individually selected managed entities displayed in the detailed view.

15. A computer-implemented method as in claim 1, wherein displaying the drill down menu includes:

highlighting a first group of the selectable drill down options to indicate that at least a first selectable drill down option and a second selectable drill down option in the first group can be selected to drill down with respect to the management information associated with the multiple managed entities; and de-highlighting a second group of the selectable drill down options to indicate that at least a third selectable drill down option and a fourth selectable drill down option in the second group cannot be selected to drill down with respect to the management information associated with the multiple managed entities.

16. A computer-implemented method as in claim 15, wherein identifying the selected drill down option includes receiving selection of the first selectable drill down option in the first group, the computer-implemented method further comprising:

in response to receiving the selection of the first selectable drill down option, i) initiating display of the management information in accordance with the first selectable drill down option, and ii) de-highlighting the first selectable drill down option to indicate that the first selectable drill down option cannot be selected.

17. A computer-implemented method as in claim 16 further comprising:

displaying path information including a first entry corresponding to the selection of the first selectable drill down option in the drill down menu.

18. A computer-implemented method as in claim 17 further comprising:

receiving selection of the second selectable drill down option in the first group;

in response to receiving the selection of the second selectable drill down option, i) initiating display of a further drill down view of the management information in accordance with the second selectable drill down option, and ii) de-highlighting the second selectable drill down option in the drill network menu.

19. A computer-implemented method as in claim 18 further comprising:

displaying the path information to include a second entry, which follows the first entry in the path information, the second entry corresponding to the selection of the second selectable drill down option in the drill down menu.

20. A computer-implemented method as in claim 19 further comprising:

enabling selection of the first entry in the path information;

in response to receiving selection of the first entry in the path information, displaying the management information in accordance with the first selectable drill down option.

21. A computer-implemented method of displaying management information on a display screen, the computer-implemented method comprising:

on a first portion of the display screen, displaying a hierarchy of selectable icons representing managed entities of a storage area network;

on a second portion of the display screen, displaying a detailed view of separately listed management information for each of at least two managed entities selected from the hierarchy; and on a third portion of the display screen, displaying a drill down menu of multiple selectable drill down options, the drill down menu being continuously displayed even after selection of one of the multiple selectable drill down options, the drill down menu enabling drilling down with respect to at least a portion of the management information displayed in the detailed view of separately listed management information;

in a fourth portion of the display screen, displaying path information in relation to the management information, the path information including: i) an entry corresponding to a present drill down level view of the displayed management information in the management view, and ii) at least one entry of a previous drill down level view of previously displayed management information;

wherein the path information includes entries indicating a sequence of drill down options selected from the drill down menu to view the present drill down menu view; and wherein the at least one entry of the previous drill down level view may be selected by a user to change contents of the management information back to corresponding previously displayed management information;

highlighting a first selectable drill down option and a second selectable drill down option in the drill down menu to indicate that from the first selectable drill down option and the second selectable drill down option can be selected by a viewer and applied to the management information in the second portion of the display screen; and in response to receiving selection of the first selectable drill down option from the drill down menu:
  i) updating the separately listed management information for each of the at least two managed entities selected from the hierarchy by providing a drill down view in accordance with the selection of the first selectable drill download; and
  ii) discontinuing highlighting of the first selectable drill down option from the drill down menu to indicate that the first selectable drill down option can no longer be selected to drill down with respect to a current drill down level view of the management information in the second portion of the display screen.

22. A computer-implemented method as in claim 21, wherein the drill down menu includes at least two sets of selectable drill down options, a first set of selectable drill down options grouped and labeled to indicate that the first set of selectable drill down options can be used to drill down with respect to storage features of a storage area network, a second set of drill down options grouped and labeled to indicate that the second set of selectable drill down options can be used to drill down with respect to host features of the storage area network.

23. A computer-implemented method as in claim 21 further comprising:
  on a fourth portion of the display screen, displaying path information including: i) an entry corresponding to a drill down view of presently displayed management information, and ii) at least one entry corresponding to a previously displayed drill down view of management information.

24. A computer-implemented method as in claim 23 further comprising:
  displaying the entry corresponding to the drill down view of presently displayed management information to include a label corresponding to a selectable drill down option selected by a viewer to view the current drill down level; and
  displaying the path information to include entries corresponding to previously viewed drill down levels of the management information.

25. A computer-implemented method as in claim 21 further comprising:
  on a fourth portion of the display screen, displaying path information including entries indicating a sequence of drill down options selected by a viewer, each of the entries being selectable by the viewer to revert back to a previous drill down level.

26. A computer system supporting management information views associated with a storage area network, the computer system comprising:
  a processor;
  a memory unit that stores instructions associated with an application executed by the processor;
  a communication interface that supports communication with other nodes of the storage area network; and
  an interconnect coupling the processor, the memory unit, and the communication interface, enabling the computer system to execute the application and perform operations of:
    receiving selection of multiple entries in a hierarchy, the selection including multiple managed entities in a network;
    displaying a management information view that includes management information associated with the multiple managed entities in the network;
    displaying a drill down menu associated with the management information view, the drill down menu including selectable drill down options that correspond to respective drill down functions selectively applied to the management information associated with the multiple managed entities;
    identifying a selected drill down option chosen from the drill down menu;
    producing a drill down view by applying the respective drill down function associated with the selected drill down option to the management information associated with the multiple managed entities, the produced drill down view including a presentation of the management information based on the applied respective drill down function; displaying the drill down view on the graphical user interface; and
    continuing to display the drill down menu even after producing the drill down view for selection of another drill down option from the drill down menu and further drilling down with respect to the produced drill down view; and
    displaying path information in relation to the management information view, the path information including: i) an entry corresponding to a present drill down level view of the displayed management information in the management view, and ii) at least one entry of a previous drill down level view of previously displayed management information;
    wherein the path information includes entries indicating a sequence of drill down options selected from the drill down menu to view the present drill down menu view; and
    wherein the at least one entry of the previous drill down level view may be selected by a user to change contents of the management information view back to a corresponding previously displayed management information view.

27. A computer system as in claim 26, wherein the respective drill down function associated with the selected drill down option identifies a particular category of multiple categories in which to drill down to a lower level with respect to the management information associated with the at least one managed entity.

28. A computer system as in claim 26 that additionally performs operations of:

highlighting a subset of drill down options in the drill down menu depending on which of the drill down options may be selected by a user to produce a next displayable drill down view.

29. A computer system as in claim 26 that additionally performs operations of:
displaying a hierarchy of managed entity icons that may be traversed based on use of a drill down technique; and
in relation to at least a portion of the managed entity icons in the hierarchy, providing a display region in relation to the managed entity icons to receive an input selection by a user of which management information to display for multiple selected managed entities of the network.

30. A computer system as in claim 26, wherein the drill down menu includes at least two sets of selectable drill down options, a first set of selectable drill down options related to storage features of a storage area network, a second set of drill down options related to host features of the storage area network.

31. A computer system as in claim 26 that additionally performs operations of:
in relation to the management information view including management information associated with the multiple managed entities in the network, displaying a detailed view of individually presented management information for each of the at least one managed entities;
enabling a user to individually select each of the multiple managed entities in the detailed view; and
wherein producing a drill down view further includes applying the respective drill down function to management information associated with individually selected managed entities displayed in the detailed view.

32. A computer system for displaying management information views associated with a storage area network, the computer system comprising:
a processor;
a memory unit that stores instructions associated with an application executed by the processor;
a communication interface that supports communication with nodes of the storage area network; and
an interconnect coupling the processor, the memory unit, and the communication interface, enabling the computer system to execute the application and perform operations of:
on a first portion of a display screen, displaying a vertical hierarchy of selectable icons representing managed entities of a storage area network;
on a second portion of the display screen, displaying a detailed view of separately listed management information for each of the at least two selected managed entities selected from the hierarchy; and
on a third portion of the display screen, displaying a drill down menu including multiple selectable drill down options, the drill down menu being continuously displayed even after selection of one of the multiple selectable drill down options, the drill down menu enabling drilling down with respect to at least a portion of the management information displayed in the detailed view of separately listed management information;
in a fourth portion of the display screen, displaying path information in relation to the management information, the path information including: i) an entry corresponding to a present drill down level view of the displayed management information, and ii) at least one entry of a previous drill down level view of previously displayed management information;
wherein the path information includes entries indicating a sequence of drill down options selected from the drill down menu to view the present drill down menu view; and
wherein the at least one entry of the previous drill down level view may be selected by a user to change contents of the management information view back to a corresponding previously displayed management information.

33. A computer system as in claim 32 that additionally performs operations of:
highlighting a first selectable drill down option and a second selectable drill down option in the drill down menu to indicate that from the first selectable drill down option and the second selectable drill down option can be selected by a viewer and applied to the management information in the second portion of the display screen; and
in response to receiving selection of the first selectable drill down option from the drill down menu:
i) updating the separately listed management information for each of the at least two managed entities selected from the hierarchy by providing a drill down view in accordance with the selection of the first selectable drill download; and
ii) discontinuing highlighting of the first selectable drill down option from the drill down menu to indicate that the first selectable drill down option can no longer be selected to drill down with respect to a current drill down level view of the management information in the second portion of the display screen.

34. A computer system as in claim 33, wherein the drill down menu includes at least two sets of selectable drill down options, a first set of selectable drill down options grouped and labeled to indicate that the first set of selectable drill down options can be used to drill down with respect to storage features of the storage area network, a second set of drill down options grouped and labeled to indicate that the second set of selectable drill down options can be used to drill down with respect to host features of the storage area network.

35. A computer program product including a computer-readable medium having instructions stored thereon for processing data information, such that the instructions, when carried out by a processing device, enable the processing device to perform operations of:
displaying a management information view that includes management information associated with at least one managed entity in a network;
displaying a drill down menu associated with the management information view, the drill down menu including selectable drill down options that correspond to respective drill down functions selectively applied to the management information associated with the at least one managed entity;
identifying a selected drill down option chosen from the drill down menu;
producing a drill down view by applying the respective drill down function associated with the selected drill down option to the management information associated with the at least one managed entity, the produced drill down view including a presentation of the management information based on the applied respective drill down function;
displaying the drill down view on the graphical user interface; and continuing to display the drill down menu even after producing the drill down view for selection of another drill down option from the drill down menu and further drilling down with respect to the produced drill down view;

displaying path information in relation to the management information view, the path information including: i) an entry corresponding to a present drill down level view of the displayed management information in the management view, and ii) at least one entry of a previous drill down level view of previously displayed management information;

wherein the path information includes entries indicating a sequence of drill down options selected from the drill down menu to view the present drill down menu view; and wherein the at least one entry of the previous drill down level view may be selected by a user to change contents of the management information view back to a corresponding previously displayed management information view.

36. A computer system for supporting management information views associated with a storage area network, the computer system including:

means for displaying a management information view that includes management information associated with at least one managed entity in a network;

means for displaying a drill down menu associated with the management information view, the drill down menu including selectable drill down options that correspond to respective drill down functions selectively applied to the management information associated with the at least one managed entity;

means for identifying a selected drill down option chosen from the drill down menu;

means for producing a drill down view by applying the respective drill down function associated with the selected drill down option to the management information associated with the at least one managed entity, the produced drill down view including a presentation of the management information based on the applied respective drill down function; and means for displaying the produced drill down view means for continuing to display the drill down menu even after producing the drill down view for selection of another drill down option from the drill down menu and further drilling down with respect to the produced drill down view;

means for displaying path information in relation to the management information view, the path information including: i) an entry corresponding to a present drill down level view of the displayed management information in the management view, and ii) at least one entry of a previous drill down level view of previously displayed management information;

wherein the path information includes entries indicating a sequence of drill down options selected from the drill down menu to view the present drill down menu view; and wherein the at least one entry of the previous drill down level view may be selected by a user to change contents of the management information view back to a corresponding previously displayed management information view.

* * * * *